United States Patent [19]
Bradford

[11] Patent Number: 5,805,747
[45] Date of Patent: Sep. 8, 1998

[54] APPARATUS AND METHOD FOR OCR CHARACTER AND CONFIDENCE DETERMINATION USING MULTIPLE OCR DEVICES

[75] Inventor: Roger B. Bradford, Reston, Va.

[73] Assignee: Science Applications International Corporation, San Diego, Calif.

[21] Appl. No.: 782,081

[22] Filed: Jan. 13, 1997

Related U.S. Application Data

[63] Continuation of Ser. No. 317,802, Oct. 4, 1994, abandoned.

[51] Int. Cl.$^6$ .................................................. G06K 9/03
[52] U.S. Cl. ........................... 382/310; 382/185; 382/186
[58] Field of Search .................................... 382/309, 310, 382/186, 187, 188, 185, 181

[56] References Cited

U.S. PATENT DOCUMENTS

| | | | |
|---|---|---|---|
| Re. 31,692 | 10/1984 | Tyburski et al. | 382/7 |
| 3,764,978 | 10/1973 | Tyburski et al. | 340/146.3 D |
| 3,764,980 | 10/1973 | Dansac et al. | 340/146.3 ED |
| 3,832,682 | 8/1974 | Brok et al. | 340/146.3 ED |
| 3,876,981 | 4/1975 | Welch | 340/146.3 D |
| 3,895,350 | 7/1975 | De Vries | 340/146.3 D |
| 3,988,715 | 10/1976 | Mullan et al. | 340/146.3 S |
| 4,032,887 | 6/1977 | Roberts | 340/146.3 ED |
| 4,180,798 | 12/1979 | Komori et al. | 340/146.3 H |
| 4,315,246 | 2/1982 | Milford | 340/146.3 D |
| 4,408,342 | 10/1983 | Grabowski et al. | 382/9 |
| 4,876,735 | 10/1989 | Martin et al. | 382/57 |
| 5,068,664 | 11/1991 | Appriou et al. | 342/90 |
| 5,418,864 | 5/1995 | Murdock et al. | 382/309 |
| 5,434,932 | 7/1995 | Scott | 382/309 |
| 5,455,872 | 10/1995 | Bradley | 382/309 |
| 5,459,739 | 10/1995 | Handley et al. | 382/310 |

OTHER PUBLICATIONS

Bradford et al., "Error Correlation in Contemporary OCR Devices," Proceedings, First Int'l. Conf. on Doc. Analysis and Recognition, St. Malo, France, 30 Sep.–2 Oct. 1991, pp. 516–524.

ScanWorX API Programmer's Guide, Version 2.0, (Jan. 04, 1993), pp. iii–ix and 1–1–1–29.

XDOC Data Format: Technical Specification, Version 2.0, (Jan. 04, 1993), pp. iii–vi, 1–1–1–2, 2–1–2–11, 3–1–3–3, 4–1–4–12, A–1–A–6, B–1–B–5, C–1–C–2, and I–1–I–7.

J.R. Ullman, "Pattern Recognition Techniques," Chapter 7, pp. 168–232 (1973).

Tsuji et al., "Character Image Segmentation," SPIE vol. 504 Applications of Digital Image Processing VII (1984), pp. 2–8.

Liang et al., "Segmentation of Touching Characters in Printed Document Recognition," IEEE Int'l. Conf. on Doc. Analysis and Recognition, pp. 569–572, Oct. 20–22, 1993.

Lu, "On the Segmentation of Touching Characters," IEEE Int'l. Conf. on Document Analysis and Recognition, pp. 440–443, Oct. 20–22, 1993.

Buchowski et al., "Omnirec: A Character Recognition System," pp. 1–61, Univ. of Texas at Austin, AI TR88–67, Feb. 1988.

(List continued on next page.)

*Primary Examiner*—Joseph Mancuso
*Attorney, Agent, or Firm*—Foley & Lardner

[57] ABSTRACT

In an optical character recognition (OCR) system an improved method and apparatus for recognizing the character and producing an indication of the confidence with which the character has been recognized. The system employs a plurality of different OCR devices each of which outputs a indicated (or recognized) character along with the individual devices own determination of how confident it is in the indication. The OCR system uses that data output from each of the different OCR devices along with other attributes of the indicated character such as the relative accuracy of the particular OCR device indicating the character to choose the select character recognized by the system and to produce a combined confidence indication of how confident the system is in its recognition.

18 Claims, 33 Drawing Sheets

OTHER PUBLICATIONS

Baird, "Feature Identification for Hybrid Structural/Statistical Pattern Classification," Computer Vision, Graphics and Image Processing 42, pp. 318–333 (1988).

Baird et al., "Components of an Omnifont Page Reader," IEEE Eighth Int'l. Conf. on Pattern Recognition, pp. 344–348, Paris, France, Oct. 27–31, 1986.

Impedovo et al., "Optical Character Recognition—A Survey," World Scientific Series in Computer Science, vol. 30 (1989), ed. PSP Wang, pp. 1–24.

Pavlidis et al., "Problems in the Recognition of Poorly Printed Text," Symposium on Document Analysis and Information Retrieval, pp. 162–173, Univ. of Nevada, Las Vegas, Mar. 16–18, 1992.

Rice et al., "The Third Annual Test of OCR Accuracy," 1994 UNLV/ISRI Annual Research Report, Univ. of Nevada, Las Vegas, Apr. 1994.

UNLV Information Science Research Institute, 1993 Annual Report, pp. 1–96 (Kevin O. Grover, ed., Information Science Research Institute).

Kimura et al., "An Integrated Character Recognition Algorithm," United States Postal Service, Advanced Technology Conference, vol. One, Nov. 5–7, 1990, pp. 605–619.

Gader et al., "Pipelined Systems for Recognition of Handwritten Digits in USPS Zip Codes," United State Postal Service, Advanced Technology Conference, vol. One, Nov. 5–7, 1990, pp. 539–548.

Matan et al., "Handwritten Character Recognition Using Neural Network Architectures," United States Postal Service, Advanced Technology Conference, vol. One, Nov. 5–7, 1990, pp. 1003–1011.

Hull et al., "A Blackboard–based Approach to Handwritten ZIP Code Recognition," United States Postal Service, Advanced Technology Conference, May 3–5, 1988, pp. 1018–1032.

Wagner et al., "The String–to–String Correction Problem," Journal of the Assoc. for Computing Machinery, vol. 21, No. 1, Jan. 1974, pp. 168–173.

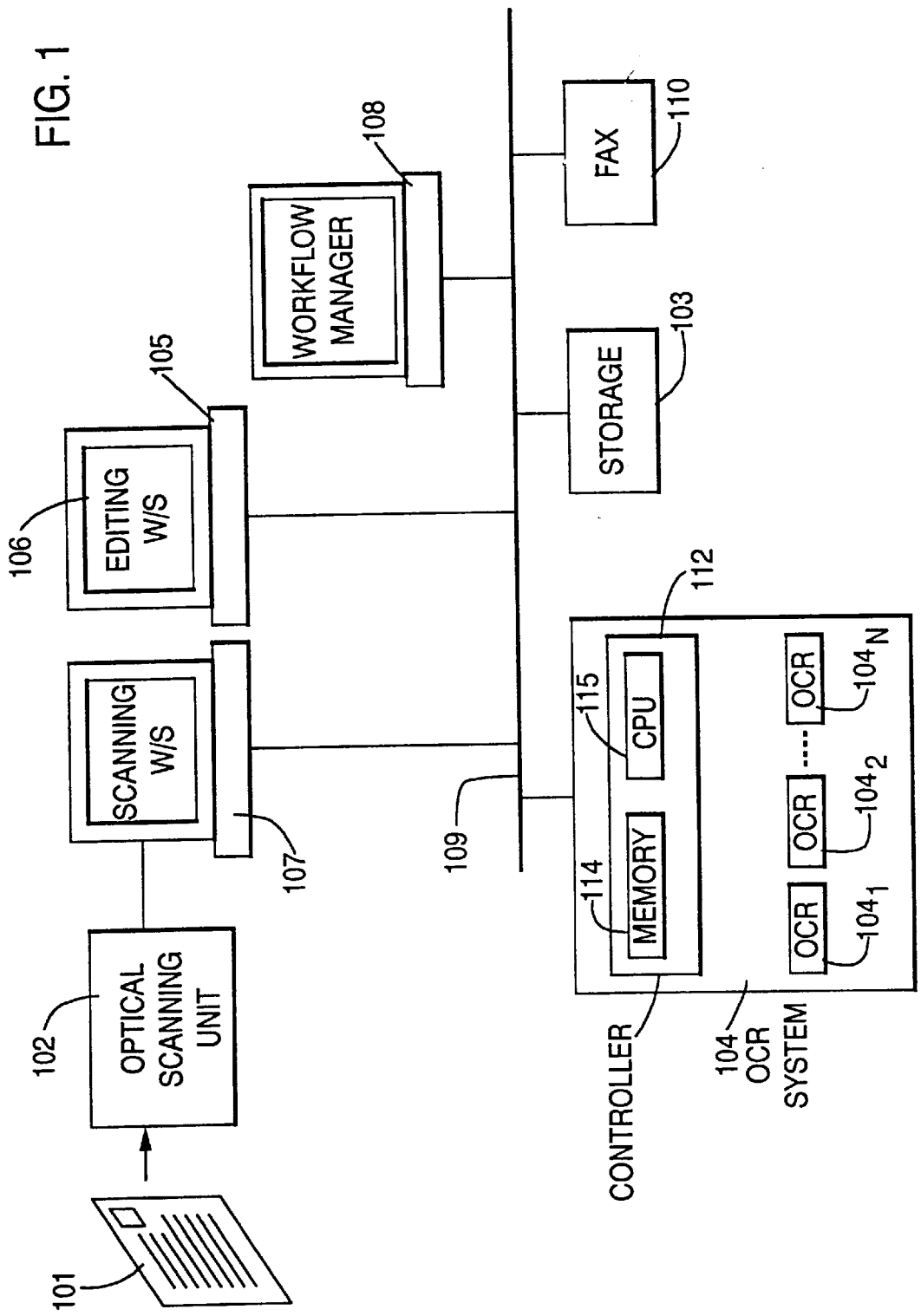

FIG. 2

| API Command | Function |
|---|---|
| CHARACTER POSITION | Include character position information in the OCR system output. |
| CLEAR | Clear any previously transmitted configuration information and restore all parameters to the default settings. |
| CLEAR ZONES | Clear any previously sent zoning information. |
| CONFIDENCE | Include recognition confidence information in the OCR system output. |
| DOCUMENT | Associate this document name with the image being transmitted. |
| ID | Return the OCR system software version number. |
| LINE POSITION | Include line position information in the OCR system output. |
| MARKER | Include markers in OCR system output. |
| RESULT FORMAT | Set the OCR system output results format to text or PDA. |
| ROTATE IMAGE | Rotate the transmitted image for image processing. |
| ROTATE TEXT | Rotate the transmitted image for recognition processing. |
| SPELL CHECK | Perform spell checking of OCR system results. |
| TERMINATE | Shutdown the OCR system. |

FIG. 3

| DEVICES IN AGREEMENT | | | DEVICES WITH FLAGS SET | | |
|---|---|---|---|---|---|
| #1 | #2 | #3 | #1 | #2 | #3 |
| X | X | X |   |   |   |
| X | X | X |   |   | X |
| X | X | X |   | X |   |
| X | X | X | X |   |   |
| X | X | X |   | X | X |
| X | X | X | X |   | X |
| X | X | X | X | X |   |
| X | X | X | X | X | X |
| X | X |   |   |   |   |
| X | X |   |   |   | X |
| X | X |   |   | X |   |
| X | X |   |   | X | X |
| X | X |   | X |   |   |
| X | X |   | X |   | X |
| X | X |   | X | X |   |
| X | X |   | X | X | X |
| X |   | X |   | X |   |
| X |   | X |   |   |   |
| X |   | X |   |   | X |
| X |   | X |   | X | X |
| X |   | X | X |   | X |
| X |   | X | X |   |   |
| X |   | X | X | X |   |
| X |   | X | X | X | X |
|   | X | X | X | X |   |
|   |   | X | X | X |   |
|   |   | X | X | X |   |
| X |   | X | X | X |   |
| X |   |   | X | X |   |
|   | X |   | X | X |   |
|   |   |   | X | X |   |
| X |   |   | X | X |   |
|   |   |   |   | X |   |
|   |   | X | X | X |   |

FIG. 5A

| OPS API Command | Xerox Wrapper Action |
|---|---|
| IMAGE DATA | The IMAGE DATA command is accompanied by a bit mapped representation of the image. The wrapper converts the image into TIFF Group 0 format and saves it in memory. |
| CHARACTER POSITION LINE POSITION CONFIDENCE MARKERS SPELL CHECK | These commands are accompanied by ON/OFF indications that are saved in memory. The ability to control spell checking is not supported in this wrapper so this configuration is ignored. |
| OCR ZONE | This command is accompanied by data representing two points (reference points) in a two dimensional coordinate system (see figure 1). These points define an OCR zone within the image transmitted with the IMAGE DATA packet. These coordinates are used to extract the sub-image data from the original image. This image is then stored in memory. |
| RESULTS FORMAT | This command is accompanied by data indicating the output format requested. |
| BEGIN | This command is used to start the recognition process. The data collected from the preceding OPS commands is used to make calls to the ScanWorX API library and begin the recognition process. Specifically the following calls are used (note: in the following discussion the routines starting with 'icr' are part of the actual ScanWorX API details can be found in the ScanWorX API Programmers Guide):<br><br>1. The XIS_SETUP structure, defined by the ScanWorX API, is initialized with default values:<br>    text_format = TEXT_XDOC;<br>    icr_h = -1;<br>    server_name = the name of the UNIX host on which the recognition engine runs<br>    image_format = TIFF<br>    percent = 100<br>    language = ICR_ENGLISH_ID<br>    illegible = ~<br>    suspect_char = ^<br>    confidence = 0<br>    input_token = IO_TOKEN_T - 1<br>    output_token = IO_TOKEN_T - 1;<br>    fd_text = NULL;<br>2. The ScanWorX function icr_intialize () is called to initialize the Xerox engine. |

FIG. 5B

| OPS API Command | Xerox Wrapper Action |
|---|---|
|  | 3. The function icr_load_language () is called to set the language to English.<br>4. The function icr_set_value () is called several times to set the V_ACCEPT_THRESH to 999, the V_QUEST_THRESH to 0, the V_XDC_CCONF to 1 and the V_XDC_WCONF to 1.<br>5. The icr_start_document () function is called to set the output results format to XDOC.<br>6. The icr_make_io_token () function is called to obtain an input and output token from the API.<br>7. The icr_image_source() function is called to declare a source image to the Xerox Engine. The type of input image format, TIFF0, is specified and the interleave recognition percentage is set to 100%.<br>8. The icr_text_sink() function is called to declare the disposition of text information.<br>9. The icr_read_image() function is called to read the image into the Xerox engine. The function icr_get_status() is called repeatedly until the engine indicates it has completed reading the image.<br>10. The icr_recognize() function is called to start recognition. icr_get_status() is again called until it indicates that the engine has recognized the image.<br>11. The function icr_get_data() is called to retrieve the recognized text (in XDOC format).<br><br>At this point the interaction with the Xerox engine is complete. |
| SEND RESULTS | The results of the OCR process, currently in XDOC format, are converted into the PDA format. The PDA format includes character position, line position, markers and confidence information if configured to do so by *control*. |

FIG. 6A

Ruthlessly pricking our gonfalon bubble,
Making a Giant hit into a double --
Words that are weighty with nothing but trouble:
Tinkers to Evers to Chance.
Franklin P. Adams

FIG. 6B-1

[a;"XDOC.9.0"]

OCR 1:

$00760;00464fRuthlessly pricking our gonfalon bubble,$760;4560f
$01040;00456fMaking a Giant hit into a double --$1040;3932f
$01328;00444fWords that are weighty with nothing but trouble:$1328;5368f
$01604;00440fTinkers to $01604;01548f$01548;01428;00576;00180sEvers to Chance.$1604;3304f
$01900;03124fFranklin P. Adams$1900;5012f

OCR 2:

OCR 3:

Ruthlessly pricking our gonfalon bubble,
Making a Giant hit into a double
Words that are weighty with nothing but trouble..
Tinkers to Evers to Chance.
Franklin P. Adams

```
OCR 2:  < 1>
        <
                                                                                                         1!
     0,                                                                                                  1!
 0,  <,   742> R -907- [-1,  -1,  -1,  -1] -1] +0+ {0,   -1,  1554, -1}
 1,  -1,   -1) u -967- [-1,  -1,  -1,  -1] -1] +0+ {-1,  -1,  -1,   -1}
 2,  -1,   -1) t -822- [-1,  -1,  -1,  -1] -1] +0+ {-1,  -1,  -1,   -1}
 3,  -1,   -1) h -941- [-1,  -1,  -1,  -1] -1] +0+ {-1,  -1,  -1,   -1}
 4,  -1,   -1) l -882- [-1,  -1,  -1,  -1] -1] +0+ {-1,  -1,  -1,   -1}
 5,  -1,   -1) e -894- [-1,  -1,  -1,  -1] -1] +0+ {-1,  -1,  -1,   -1}
 6,  -1,   -1) s -825- [-1,  -1,  -1,  -1] -1] +0+ {-1,  -1,  -1,   -1}
 7,  -1,   -1) s -862- [-1,  -1,  -1,  -1] -1] +0+ {-1,  -1,  -1,   -1}
 8,  -1,   -1) l -800- [-1,  -1,  -1,  -1] -1] +0+ {-1,  -1,  -1,   -1}
 9,  -1,   -1) y -923- [-1,  -1,  -1,  -1] -1] +0+ {-1,  -1,  -1,   -1}
10,  <1554, 742> p -971- [-1,  -1,  -1,  -1] -1] +-1+ {1554, -1, -1, 869, -1}
11,  -1,   -1) r -921- [-1,  -1,  -1,  -1] -1] +-1+ {-1,  -1,  -1,   -1}
12,  -1,   -1) i -952- [-1,  -1,  -1,  -1] -1] +-1+ {-1,  -1,  -1,   -1}
13,  -1,   -1) c -917- [-1,  -1,  -1,  -1] -1] +-1+ {-1,  -1,  -1,   -1}
14,  -1,   -1) k -975- [-1,  -1,  -1,  -1] -1] +-1+ {-1,  -1,  -1,   -1}
15,  -1,   -1) i -953- [-1,  -1,  -1,  -1] -1] +-1+ {-1,  -1,  -1,   -1}
16,  -1,   -1) n -883- [-1,  -1,  -1,  -1] -1] +-1+ {-1,  -1,  -1,   -1}
17,  -1,   -1) g -942- [-1,  -1,  -1,  -1] -1] +-1+ {-1,  -1,  -1,   -1}
18,  <2424, 742> o -943- [-1,  -1,  -1,  -1] -1] +-1+ {2424, -1, -1, 411, -1}
19,  -1,   -1) u -966- [-1,  -1,  -1,  -1] -1] +-1+ {-1,  -1,  -1,   -1}
20,  -1,   -1) r -900- [-1,  -1,  -1,  -1] -1] +-1+ {-1,  -1,  -1,   -1}
21,  <2835, 742> g -915- [-1,  -1,  -1,  -1] -1] +-1+ {2835, -1, -1, 944, -1}
```

```
ocr 0, line 0] = 464,  760, 4096,  -1  Ruthlessly pricking our gonfalon bubble,
ocr 0, line 1] = 456, 1040, 3476,  -1  Making a Giant hit into a double --
ocr 0, line 2] = 444, 1328, 4924,  -1  Words that are weighty with nothing but trouble:
ocr 0, line 3] = 440, 1608, 2864, 180  Tinkers to Evers to Chance.
ocr 0, line 4] = 3124, 1900, 1888,  -1  Franklin P. Adams ocr 1, line 0] =   0,  742, 4563,  -1  Ruthlessly pricking our gonfalon bubble,
ocr 1, line 1] =   0, 1030, 3935,  -1  Making a Giant hit into a double --
ocr 1, line 2] =   0, 1309, 5376,  -1  Words that are weighty with nothing but trouble:
ocr 1, line 3] =   0, 1597, 3311,  -1  Tinkers to Evers to Chance.
ocr 1, line 4] =   0, 1852, 5022,  -1  Franklin P. Adams ocr 2, line 0] =  -1,   -1,   -1,  -1  Ruthlessly pricking our gonfalon bubble,
ocr 2, line 1] =  -1,   -1,   -1,  -1  Making a Giant hit into a double
ocr 2, line 2] =  -1,   -1,   -1,  -1  Words that are weighty with nothing but trouble..
ocr 2, line 3] =  -1,   -1,   -1,  -1  Tinkers to Evers to Chance.
ocr 2, line 4] =  -1,   -1,   -1,  -1  Franklin P. Adams
```

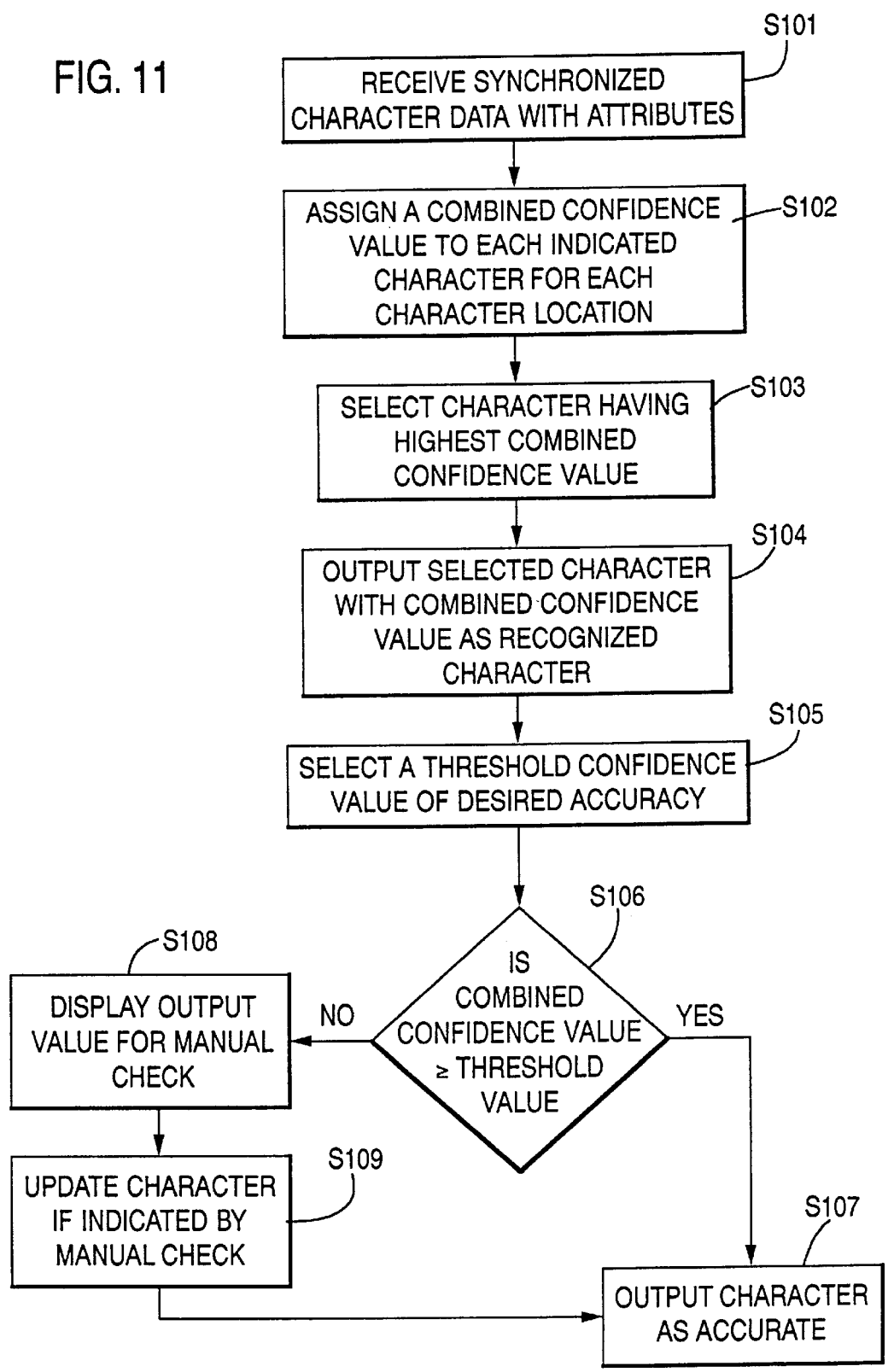

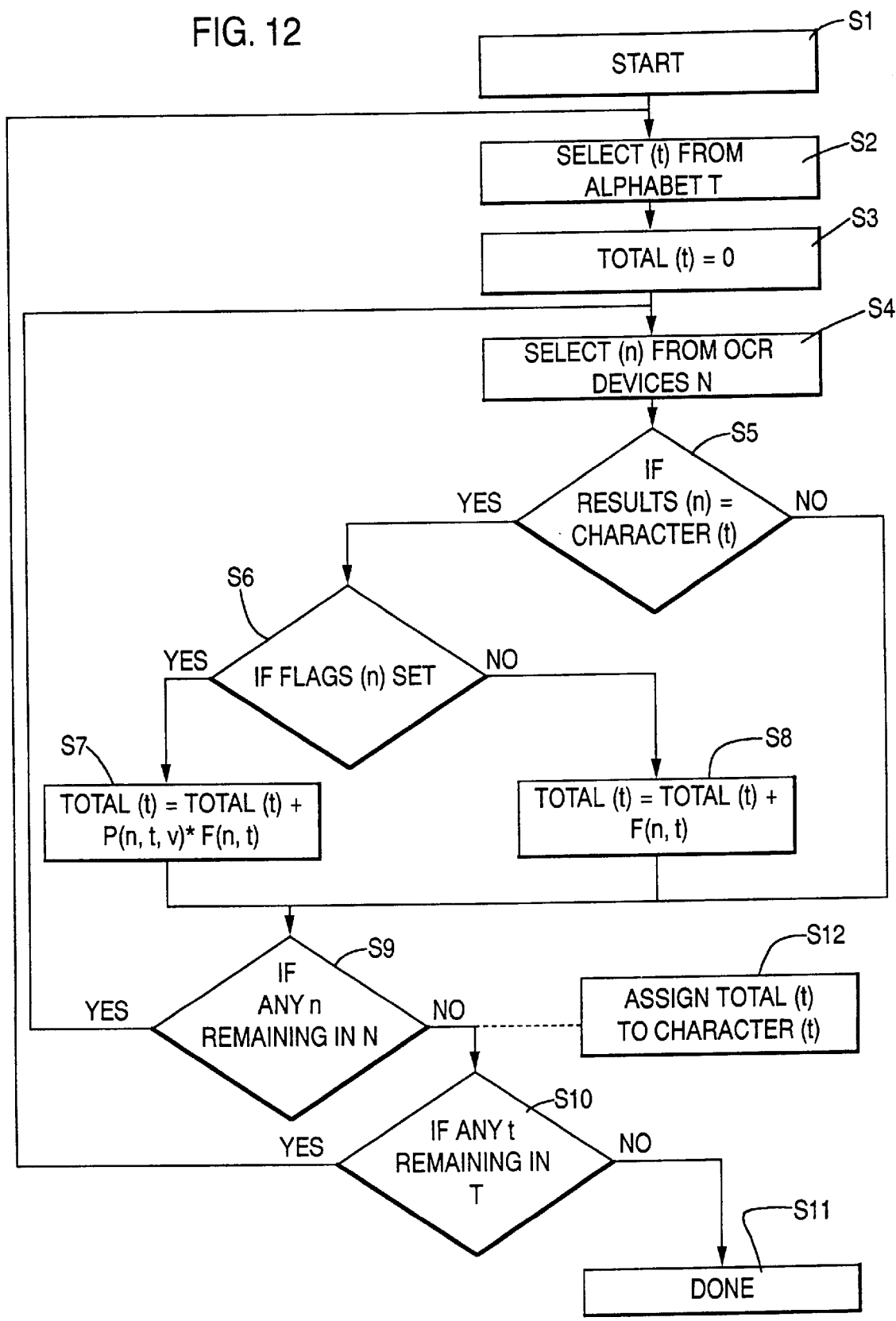

5,805,747

APPARATUS AND METHOD FOR OCR CHARACTER AND CONFIDENCE DETERMINATION USING MULTIPLE OCR DEVICES

This application is a continuation of application, Ser. No. 08/317,802, filed Oct. 4, 1994 now abandoned.

REFERENCE TO MICROFICHE APPENDIX

Reference is made to the microfiche appendix showing a computer program used in carrying out the invention. This appendix contains 5 microfiche having a total of 469 frames.

BACKGROUND OF THE INVENTION

Optical character recognition (OCR) systems are used to convert characters from hard-copy form (paper, microfilm, etc.) to a form that can be more readily stored and processed electronically. Most modern OCR devices explicitly or implicitly carry out three key functions during the overall recognition process. The first is segmentation. The purpose of segmentation is to isolate the images of individual characters to be recognized. In some cases, more than one character may be treated as a single entity as, for example, the ligature ff. (Ligatures are combinations of characters that are printed as a single, connected element. For example, the character pair ff, in many type fonts is printed as a single character. Some OCR systems will treat such a combination as a single entity for purposes of recognition.) A few attempts have been made to recognize whole words at a time. This approach has been applied primarily to recognition of handwritten material. In general, this approach has met with only limited success. It is typically applied in cases where only a limited number of words are appropriate, such as in writing the amount on a check.

Various methods are known for accomplishing segmentation and are described in, for example, Tsuji et al., "Character Image Segmentation," SPIE Vol. 504 Applications of Digital Image Processing VII (1984), pp. 2–8; Liang et al., "Segmentation of Touching Characters in Printed Document Recognition," IEEE International Conference on Document Analysis and Recognition, pp. 569–572, Tsukuba Science City, Japan, Oct. 20–22, 1993; Lu, "On the Segmentation of Touching Characters," IEEE International Conference on Document Analysis and Recognition, pp. 440–443, Tsukuba Science City, Japan, Oct. 20–22, 1993; and Buchowski et al., "Omnirec: A Character Recognition System," pp. 1–61, Univ. of Texas at Austin, AI TR88–67, February 1988, the contents of which are incorporated herein by reference.

The next function of OCR systems is feature extraction. Older OCR systems sometimes employed a matrix matching technique. This approach directly compared the pattern of pixels of an unknown character with stored patterns of known characters. This approach is of utility only when character variability is limited. A more sophisticated approach examines particular features of a character. Feature extraction is accomplished by measuring selected characteristics (features) of the character images. Various feature extraction methods are described in, for example, Baird, "Feature Identification for Hybrid Structural/Statistical Pattern Classification," Computer Vision, Graphics and Image Processing 42, pp. 318–333 (1988); Baird et al., "Components of an Omnifont Page Reader," IEEE Eighth International Conference on Pattern Recognition, pp. 344–348, Paris, France, Oct. 27–31, 1986; and Impedovo et al., "Optical Character Recognition -A Survey," World Scientific Series in Computer Science, Vol. 30 (1989), ed. PSP Wang, pp. 1–24, the contents of which are incorporated herein by reference.

The third key function of the OCR device is to classify the characters. Classification is accomplished through the application of decision logic to identify each character. Typically, classification is accomplished through a comparison of measured features with values or ranges of feature measurements obtained from known characters.

One problem with existing OCR devices is that once the OCR device has generated a character text stream representing the digital page image provided to the OCR, errors which inevitably occur in the OCR's performance must be corrected. Even the best OCR devices on the market generate a substantial number of errors in recognizing characters. The number and type of errors produced by conventional OCR devices are described in, for example, Pavlidis et al., "Problems in the Recognition of Poorly Printed Text," Symposium on Document Analysis and Information Retrieval, pp. 162–173, University of Nevada, Las Vegas, Mar. 16–18, 1992; Rice et al., "The Third Annual Test of OCR Accuracy," 1994 UNLV/ISRI Annual Research Report, University of Nevada, Las Vegas, April 1994; and UNLV Information Science Research Institute, 1993 Annual Report, pp. 1–96 (Kevin O. Grover, ed., Information Science Research Institute), the contents of which are incorporated herein by reference.

One commonly used method for correcting errors generated by the OCR device is to perform a spell-check on the converted document. However, spell-checking a document to increase its accuracy has a number of drawbacks. First, due to the spell-checker's inability to correct numerical data, it cannot practically be used to correct errors in applications having a high degree of numerical input. Further, a spell-checking device will typically generate a large number of false alarms (i.e., flagging characters that are, in fact, correct), particularly if the scanned image includes a number of lesser-known words or acronyms which are not found within the spell-checker's dictionary. If such lesser-known words or acronyms are added to the dictionary, it increases the likelihood that the spell-checking operation will fail to identify an actual error which corresponds to the added acronyms or words. Additionally, due to the large number of false alarms, the vigilance of the individual performing the spell-check is greatly decreased and the probability of the person missing a correctly identified error is increased.

Spell-checking a document is also a very time intensive operation which greatly increases the number of manual labor hours required to accurately convert characters from hard copy form to electronic form. It should be noted that in most practical applications, the greatest expense associated with converting page information into electronic form using OCR is the costs associated with manual checking and correcting of errors. Thus, it is desired that not only the accuracy of the OCR device be improved, but also that an ability to identify with high precision where the possible errors are located within the electronic text be provided.

In response to the latter problem, some current OCR devices provide an indication of recognition confidence. The recognition confidence typically is determined by the closeness of the match between measured features of the character to be identified and previously measured features of known characters. In general, a vector space analogy can be applied to this process. For an OCR system employing N features, an unknown character can be represented by the corresponding point in N-dimensional space. Collections of measurements performed on known characters can be used to generate N-dimensional ellipsoids in this space. A distance measure can be applied between the point in question and the edge (or centroid) of the ellipsoid. The smaller this distance, the more reliable the recognition is considered to be.

Many different combinations of feature vectors and classification techniques have been used in OCR systems to try and improve the accuracy of character recognition as well as recognition confidence. However, for each of the currently known combinations of a feature set and a classification technique, the corresponding indication of recognition confidence based on the distance measurement described above has inherent weaknesses. Such recognition confidence indications are deficient in two respects. First, the probability of detection (i.e., detecting that a character has been incorrectly recognized) is too low. Second, the false alarm rate, described above, is too high.

In order to overcome the inherent deficiencies in known OCR devices, attempts have been made to combine the results from more than one classifier in order to obtain improved character recognition accuracy. The multiple distance measurements available in such a situation potentially could provide a basis for significantly improved determination of recognition confidence. However, using this method in practice has only realized small gains in recognition confidence. This is because developing an effective means of combining such multiple distance measurements is not straightforward. In general, the relationship between the multiple distances and recognition confidence is nonlinear. OCR devices using the necessary robust techniques for combining multiple distances as described above to yield high recognition confidence have heretofore not been developed.

To date, only simplistic approaches to combining distance measurements have been employed in known OCR devices to derive confidence indications. Such approaches have yielded limited improvements in recognition confidence indication. Such a simplistic approach is illustrated by Kimura et al., "An Integrated Character Recognition Algorithm," United States Postal Service, Advanced Technology Conference, Vol. One, Nov. 5–7, 1990, pp. 605–619; Gader et al., "Pipelined Systems For Recognition of Handwritten Digits In USPS Zip Codes," United States Postal Service, Advanced Technology Conference, Vol. One, Nov. 5–7, 1990, pp. 539–548; Matan et al., "Handwritten Character Recognition Using Neural Network Architectures," United States Postal Service, Advanced Technology Conference, Vol. One, Nov. 5–7, 1990, pp. 1003–1011; and Hull et al., "A Blackboard-based Approach to Handwritten ZIP Code Recognition," United States Postal Service, Advanced Technology Conference, May 3–5, 1988, pp. 1018–1032, the contents of which are incorporated herein by reference.

SUMMARY OF THE INVENTION

It is therefore an object of the instant invention to provide an improved character recognition method and apparatus which utilizes the different information output by a plurality of different OCR devices to recognize characters with a high degree of accuracy and to simplify and reduce the need for manual checking and editing.

In accordance with the instant invention there is provided a character recognition (CR) system for recognizing characters within a digital page image, which includes: an input interface connected to receive the digital page image; a plurality of CR devices, each connected to receive the digital page image from the input interface, each of the CR devices converting the digital page image into output data signals representing text and one or more CR attributes corresponding to the text; and a voting unit coupled to receive the output data signals from each of the plurality of CR devices. The voting unit produces a combined data signal representing a recognized text and one or more combination attributes corresponding to the recognized text on the basis of the text and the attributes in each of the output data signals. The CR attributes may include a CR confidence indication as a CR confidence value which represents a level of confidence that a character identified by a corresponding CR is accurate. The device also produces a combined confidence indication which represents a level of overall confidence that a character in the recognized text is accurate.

In one embodiment of the instant invention there is provided a text editor connected to receive the combined data signal and a check indicator which receives the text and the combined confidence indication and sets a flag at characters having a combined confidence value below a threshold value. The flagged characters are identified to be manually checked by an operator.

According to the instant invention there is also provided a method for recognizing characters contained in a digital page image. The method includes the steps of: providing the digital page image to a plurality of character recognition (CR) devices; indicating in each of the CR devices a indicated character and one or more attributes associated with the indicated character for each character location in the digital page image; selecting a selected character and assigning a selected character attribute to the selected character for a particular character location on a basis of the indicated character and the one or more attributes associated with the indicated character for the particular character location from each of the CR devices; and outputting the selected character and the selected character attribute as a recognized character and a recognized character attribute. The method may further include the steps of assigning a value to each indicated character indicated by at least one of the CR devices, the value being generated on a basis of the number of how many CR devices indicate the indicated character, which of the CR devices indicated the indicated character and the confidence indication associated with the indicated character for each of the CR devices indicating the character, and choosing from among the characters indicated by at least one of the CR devices a indicated character having a highest assigned value. The indicated character chosen is selected as the selected character and the highest value as the selected character attribute.

In still another embodiment of the instant invention the character recognition system includes: a CR unit, having a plurality of CR devices which receive the digital page image and convert it into corresponding streams of character data, where at least one of the streams of character data corresponding to one of the CR devices including positional information; a synchronization unit, connected to receive the streams of character data from the CR unit to aligning the character positions within the streams of data using the positional information; and a voting unit which takes the synchronized streams of character data and selects an output character for the regions where at least two of the synchronized streams of character data indicate different recognized characters.

BRIEF DESCRIPTION OF THE DRAWINGS

The present invention may be best understood with reference to the following detailed description in conjunction with the accompanying drawings, in which:

FIG. 1 represents a high level diagram of a system according to an embodiment of the instant invention;

FIG. 2 depicts configuration commands in the API that are set by a client to control the recognition process;

FIG. 3 depicts a table graphically illustrating the gradations of confidence achieved by an OCR system according to an embodiment of the instant invention;

FIGS. 5A–5B show the general flow of processing in a specific wrapper as an example of typical API commands used in an embodiment of the invention;

FIG. 6A is an example of the image data used to explain some of the features of the invention;

FIG. 6B is the XDOC representation of the example of FIG. 6A;

FIG. 6C is a modified PDA representation of the XDOC representation of FIG. 6B;

FIG. 6D depicts the common PDA format provided as an output of three OCR devices (OCR's 1–3), each having recognized the image data of FIG. 6A;

FIGS. 7(A and B), 8(A and B), and 9(A and B) depict a human-readable description of the common PDA results of FIG. 6D for OCR's 1–3 respectively;

FIG. 10 shows the metrics for closeness of the lines of each of the OCRs 1–3 using the pairwise calculations of the Wagner-Fisher edit distance metric;

FIG. 11 is a flow chart illustrating the operation of a device operated according to an embodiment of the instant invention; and FIG. 12 provides a flow chart illustrating the operation of the voting unit depicted in FIG. 3.

DETAILED DESCRIPTION OF THE PREFERRED EMBODIMENTS

Figure 4:
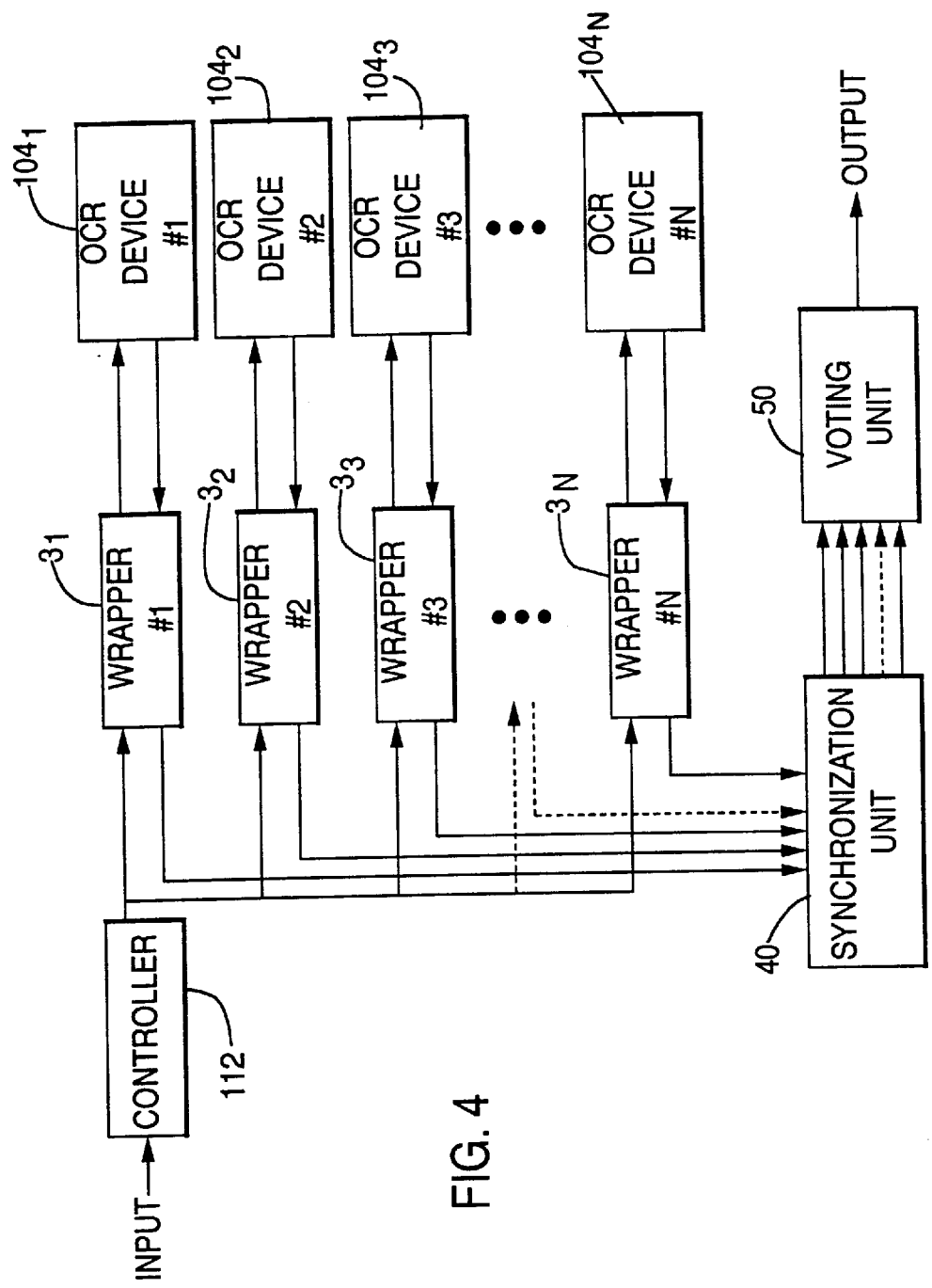
FIG. 4 represents an embodiment of a digital differential processing system employed in an embodiment of the instant invention.

Optical character recognition (OCR) systems are used to convert characters from hard-copy form (paper, microfilm, etc.) to a form that can be more readily stored and processed electronically. Specifically, OCR systems convert images of characters, usually provided to the system in some standard format (for example, TIFF), into specific computer-coded equivalents of those characters (ASCII, EBCDIC, etc.). In carrying out this conversion process, some fraction of the characters are not converted correctly.

As discussed above, many contemporary OCR devices provide an indication of recognition confidence used to improve the efficiency of locating OCR errors. In some cases, the indication consists of a flag that is associated with individual words or characters. Such flags generally consist of a bit that is set when the word or character is not recognized with high confidence. In other cases, a numerical indication of the degree of recognition confidence is given.

The reliability of the recognition confidence indicators of current OCR devices is limited. Such devices make two types of errors: (1) flagging characters which are in fact, correct; and (2) failing to flag characters that are wrong. Such errors lead to inefficiencies since significant manual labor must be employed to locate and correct erroneous characters. This, in turn, leads to inefficiency in the overall OCR conversion process.

Thus, according to the instant invention there is provided an OCR system which significantly improves both the accuracy of the character recognition and the reliability of a recognition confidence indication. With reliable indication of potentially erroneous characters, manual labor can be focused more efficiently on checking such characters. This greatly reduces the cost of overall OCR conversion operations.

The invention described here approaches the recognition confidence problem from a high level of integration. Multiple OCR devices (hardware and software) are employed to provide multiple indications of the identity of each character and multiple indications of character recognition confidence. In previous work by the instant inventor described in Bradford et al., "Error Correlation in Contemporary OCR Devices," Proceedings, First International Conference on Document Analysis and Recognition, St. Malo, France, 30 Sep.–2 Oct. 1991, incorporated herein by reference, a simplistic system is described wherein a number of commercially available OCR devices were used simultaneously in a combined manner as processing elements to improve the accuracy of character recognition. In this 1991 paper, a simple voting operation is described, and the character indicated by the greatest number of different OCR devices is selected as the recognized character.

In the instant invention, a multiple OCR system is employed and various attributes of each of the individual OCR devices are used in a combined manner to provide improved character accuracy along with an indication of recognition confidence. As more fully described below, these attributes would include, for example, which device indicated a particular character, how accurate that device is historically in recognizing that character, how confident that device is in its indications, etc. As described below, such a system has significant advantages over systems using a single OCR device and the above referenced system employing a simple voting technique with multiple OCR devices.

FIG. 1 shows a high level view of an operating environment for use of the OCR device of the instant invention. It is understood, however, that the principles of the instant invention are not limited to the operating environment illustrated. In FIG. 1, a hard-copy page 101 includes images representing alphanumeric characters. An optical scanning unit 102 scans the hard-copy page 101 and produces electronic signals corresponding to a digital page image representing the image of hard-copy page 101. A scanning workstation 107 is provided to receive the digital page image and is used to perform any necessary or desired functions to prepare the image for character recognition. For example, the scanning workstation 107 may be used to zone the page image for character recognition. Zoning is accomplished by defining one or more locations on the page where text images are found. A zone is defined as a rectangular box surrounding a portion of the input page image. By use of zoning, character recognition can be carried out only on those portions of the page image which have text images, thus ignoring portions of the page image having graphic images which would tend to frustrate character recognition. Further, zoning may be used to define text set forth in multiple columns so that character recognition takes place on a column by column basis rather than horizontally across the entire page.

The digital page image may be supplied to storage unit 103 which may include, for example, fixed disk storage or transportable memory, e.g., a floppy disk, for holding the data. The storage unit is connected to the scanning workstation over a network 109. The network 109 connects the various elements in the system. An OCR system 104 is connected to receive the digital page image from the storage unit 103 or directly from the workstation 107. Alternately, the OCR system 104 may be connected directly to the optical scanning unit 102, Moreover, the digital page image could be created at some remote location and brought into the system through a transportable memory interface or from some other device connected to the network 109 which generates page image data such as a facsimile machine 110.

The OCR system 104 includes a plurality of individual OCR devices $104_1$, through $104_N$, and a controller 112 comprising a memory 114 (e.g., a ROM or RAM) and a central processing unit (CPU) 115. The OCR system 104 takes the input digital page image and converts it into a digital text stream which may then be supplied to an editing workstation 105. The digital text stream includes attributes for each character, including for example, the level of confidence that the character is accurately recognized by the overall system. As will be more fully understood below, the individual attributes for each character output from the OCR system 104 are composite attributes which are derived from the various attributes associated with each character indicated by the individual OCR devices $104_1$–$104_N$.

The editing workstation 105 includes a display 106 which allows an operator to manually view the converted data and to make corrections to the errors generated by the OCR system 104. As will further be described below, the editing workstation 105 is capable of discriminating which of the individual characters should be reviewed for accuracy using the character attributes and would also include, for example, word spell-check functions. The corrected text can then be stored in the storage unit 103.

It is further recognized that when the accuracy of the digital text stream output from the OCR system 104 is sufficiently high for a particular application, the output digital text could be directly stored in the storage 103 without further editing. In other words, actual use of a manual editing step is not always necessary for a given application. For example, output characters, with their associated attributes, could be entered directly into a database. When retrieving data, greater or lesser confidence might be placed on retrieval results, depending on the values of the confidence attributes (more fully described below) associated with retrieved segments of text. Similarly, a page of text might be processed and the confidence attributes of the resulting text averaged together. The average (or other function of the values) might then be used to decide if the OCR system 104 made too many errors, and thus the page should be manually keyed.

A workflow manager 108 is provided to monitor and manage the overall system. In the environment shown, the OCR system 104 operates as a resource in a network environment. In such an environment an Application Program Interface (API) must be provided to allow the various other devices to interact with the OCR system 104. In this framework the API communicates with the OCR system 104 using data packets. These packets have a simple, yet robust, format which provides any application full configuration of the various capabilities of the OCR system as more fully described below. Prior to developing the detailed operation of the OCR system 104, the basic framework of an OCR system 104 API is provided.

The OCR system 104 API defines the syntax and semantics of communications between the OCR system 104 and another device, a client, requesting OCR services. Within the API, there are several configuration commands that are set by the client to control the recognition process as illustrated in FIG. 2.

The environment shown in FIG. 1 is only illustrative. Many of the various devices shown may be removed or combined. For example a single workstation may be used to perform the functions of the scanning workstation 107, the editing workstation 106 and the workflow manager 108. Alternatively, a stand-alone OCR system may incorporate all of the various elements and be connected directly to the optical scanning unit 102.

The operation of the OCR system 104 described in FIG. 1 will be better understood by reference to the following more general description of the features of the instant invention and the detailed description which follows. Also attached as a microfiche appendix is the current software code stored in computer memory 114 and used to implement the various major functions of the instant invention.

The instant invention takes advantage of two key factors. First, errors in character recognition produced by individual different OCR devices are significantly decorrelated. Use of multiple different OCR devices in parallel simultaneously exploits decorrelation of the various functions carried out by the OCR devices (i.e., segmentation, feature extraction, and classification) as implemented by different OCR approaches. The decorrelation of the errors extends to the line, word and character level. Significant advantages are obtained by exploiting the difference in each of these functions. For example, different OCR segmentation approaches lead to substantial differences in character recognition errors.

The instant invention also exploits the fact that certain OCR devices are more reliable than others. The difference in reliability also extends to the character level. Thus, for example, one device might be most accurate at recognizing the letter "o" while a different device might be most accurate at recognizing the letter "a". Thus, the instant invention exploits the hierarchy of the devices at the character level as is more fully described below.

The second important factor underlying the instant invention is that multiple inputs at the character level are combined in a much more simple manner than multiple classification distances previously used to increase character recognition confidence in single OCR implementations. Simple logical functions of character identification and character recognition confidence are used to achieve a highly effective basis for improved recognition confidence indication. Even when using only the information about which OCR device made an indication and how confident the OCR device is, a very high degree of accuracy can be obtained.

A simple example where three OCR devices are operated in parallel in the OCR system 104 illustrates the above principles. For each character position in the image there are three indications of character identity, one provided by each OCR device. This includes the possibility that one or more OCR devices may indicate that a character does not occur at a given location in the image being processed, even though other OCR devices do. Combining the three OCR device outputs, which include one or more attributes, through a voting scheme (more fully described below), produces an improved indication of the identity of the character in question.

In accordance with a preferred embodiment of the invention the voting scheme uses character recognition confidence indicators of the multiple OCR devices to generate a highly accurate indication of recognition confidence. In this simple case, each of the individual OCR devices may output two items of information at each character location: (1) character identity; and (2) a confidence flag (or value) indicating recognition uncertainty. Both of these outputs are used by the OCR system 104 in the character identification operation of the system and in deriving an indication of overall recognition confidence in that character. In the best (highest confidence) case, all three devices would agree on character identity and none would set a flag indicating uncertainty. In a worst (lowest confidence) case, only two machines would agree, the two least accurate of the three devices, and all three OCR devices set flags indicating uncertainty. In this simplest case, at least two OCR devices must agree to accomplish a vote. However, use of multiple parameters may enable the system to indicate a confident output when none of the devices agree, due to a potential correlation in the different indications.

Even in the simplest case with only three devices providing outputs, and a simple on/off flag indicating device confidence, 32 gradations of recognition confidence are possible. FIG. 3 graphically illustrates in table form the input conditions associated with differing gradations of recognition confidence. In the table of FIG. 3, the most accurate individual device is designated as OCR #1, and the least accurate is designated as OCR #3. The table approximates the order of recognition confidence from highest to lowest. In practice, testing against a known database can be conducted to determine the actual order. The order will generally be close to that shown in FIG. 3. Minor differences may occur, for example, if the relative reliability of the confidence flags from the devices is different than the relative character accuracies of the devices.

When the individual OCR devices are capable of producing more robust indications of character recognition confidence, far more combinations of outputs (corresponding to gradations of confidence) are produced. For example, if each OCR device in the OCR system 104 produces a high/medium/low character confidence indication, the number of combined possibilities increases to 108. The combined number also grows rapidly as the number of individual OCR devices $104_1$–$104_N$ (i.e., the value of N) used in the system increases. Using five OCR devices, and only on/off confidence flags, there are 832 possible combinations. More generally, with n devices, each providing an m-bit confidence flag, there are $(2^n-n-1)(2^m)^n$ combinations.

In generating a table such as the one depicted in FIG. 3, the overall accuracies of the individual OCR devices employed is also taken into account. The hierarchical order is generated based on testing using ground truth data (i.e., character images with accurately known coded character equivalents). Further, according to the instant invention, the relative recognition accuracies of the devices on a character-by-character basis may be taken into account. For example, separate calibrations of the combined confidence indicators could be measured, stored in memory 114, and used on a character-by-character basis to produce output indicators in the manner more fully described below.

Several distinct advantages are achieved according to the instant invention over previous approaches to recognition confidence indications. The instant invention allows any software device or system capable of recognizing characters to be used as a component in OCR system 104. This allows the combination of a broad range of recognition approaches rather than limiting processing to those approaches implemented by a single OCR device. The various OCR devices $104_1$–$104_N$ can be selected from commercially available OCR devices manufactured by different vendors. These commercially available OCR devices can be connected together to operate in parallel according to the instant invention. Thus, the considerably diverse effort of a number of developers of OCR technology can be combined in single systems in a synergistic manner. The combination of results at the character (or character-plus-flag) level is much simpler to implement than previous attempts to improve accuracy and recognition confidence by using multiple distance measurements in conjunction with multiple classifiers. Further, the accuracy of such approaches is significantly greater than previous approaches.

In actual tests performed, exploiting only the relative overall accuracy of the individual OCR devices and their own confidence indications, the combined confidence indicators attained through this approach have been demonstrated to be much more reliable than those obtained using previous approaches. The best results obtained by conventional systems typically have been in the range of a 50% probability of detection of an erroneous character at a false alarm rate of 50%. A system according to the instant invention was tested using: "CAERE's OMNIPAGE" "CALERA's WORDSCAN" "EXPERVISION'S TYPE READER". "XEROX's SCANWORX" and ELECTRONIC DOCUMENT, TECHNOLOGY's IMAGE READER. Using the above OCR system according to the instant invention, better than 99% detection of errors were obtained at false alarm rates similar to the conventional false alarm rates. The actual test results obtained in early testing indicate that with 4% of the characters marked,(i.e., flagged to the operator for manual confirmation/checking) 99.96% overall corrected accuracy could be obtained. If the system were set to mark 4.5% of the characters, 99.99% overall accuracy was obtained. Such accuracy is a dramatic improvement over the results obtained using other current techniques where only 99.3–99.6% overall accuracy is obtained after editing when 4% of the characters are marked. See, Rice, Third Annual Test of OCR Accuracy, graph 10*a*. An increase of 0.3% represents substantial savings in correction time as well as providing a system which produces highly accurate test results. This accuracy will be even greater as more attributions associated with the individual OCR device's character indications are factored in. Such an improved accuracy is extremely important since missed errors are of great significance in many OCR applications (for example, in check reading, forms processing, litigation support, and conversion of technical manuals). Further, known techniques for correcting errors (i.e., spell-check) are not practical in many such applications due to the use of numbers and acronyms.

Another advantage of the instant invention is the availability of a very fine-grained indication of recognition confidence. This allows for highly optimized application of manual labor checking and correcting of potential and actual OCR errors. Trade-offs can be made between the number of allowable errors versus the amount of time devoted to performing manual corrections. In the case of continuous-text applications, reliable confidence attributes can be used as the basis for a much more cost-effective OCR error correction process than the spell-check operation typically employed. In forms processing applications, such confidence attributes can provide a means for routing fields for manual checking in the absence of typically employed clues such as batch totals. Such usages of the confidence indicators are possible since the confidence indicators of the instant invention are both reliable and sufficiently fine-grained.

It is particularly noted that the combined recognition confidence indicators are much more stable than those produced by earlier techniques. The instant invention's focus upon consistency of recognition among multiple recognition techniques, provides a greatly improved overall output. The instant invention is not heavily influenced by the response of specific recognition algorithms to specific types of character and document degradations.

According to the instant invention, absolute calibration of a recognition confidence level, i.e., associating specific confidence levels with specific character accuracy levels, can be achieved. This may either be accomplished with a broadly representative ground truth database to provide a calibration of broad applicability or with an application-specific ground truth databases which provides more accurate calibration for specific applications.

The processing of the digital page image produced by scanning unit 102 in the OCR system 104 according to an embodiment of the invention will be further described in connection with FIG. 4. FIG. 4 depicts an embodiment of the OCR system 104 and is also herein referred to as a differential processing system (DPS).

The input to the system is a digital page image in one of several standard formats (for example, TIFF) and is generated by scanning unit 102 (FIG. 1). Within the controller 112 of the differential processing system, image queuing software fetches images to the system and then manages distribution of those images to other parts of the DPS. The image queuing software distributes the images to each of N (N is a natural number) OCR devices $104_1$–$104_N$ in the system. Each of the individual OCR devices $104_1$–$104_N$ utilize different character recognition techniques. They may be either software systems operating on commercial circuit boards or they may be actual hardware devices. The devices may be a number of commercially available OCR devices produced by individual vendors, as for example those previously mentioned. Each device has its own format in which it receives images and an associated set of commands necessary to operate the device. In addition it has its own format in which it outputs text and additional attributes, such as the confidence values associated with each text element.

For each OCR device $104_1$–$104_N$ there is a wrapper $3_1$–$3_N$ provided. The wrappers $3_1$–$3_N$ may be accomplished in software, for example, and translate the input page image from a digital common image format into the image formats specific to the individual OCR devices $104_1$–$104_N$. The wrappers $3_1$–$3_N$ also generate the commands needed to operate the individual OCR devices $104_1$–$104_N$, monitor error conditions, monitor timing of the information that passes through the OCR device $104_1$–$104_N$, and convert the output text and attributes to a common format for subsequent processing by the DPS. The operation of the wrapper is more fully described below.

The wrappers $3_1$–$3_N$ are provided for each of the individual OCR devices $104_1$–$104_N$. The wrappers provide an interface between a third party OCR engine (acting as one of the OCR devices $104_1$–$104_N$) and the OCR system controller 112 (FIG. 1). Commands are transmitted from the controller 112 to the wrappers 3. The wrapper translates these commands into the appropriate commands for the third party engine. Since each engine has its own syntax for processing images, a unique wrapper must be written for each third party OCR engine. Provided below is an example of how a wrapper would be implemented to interface with the API of "XEROX's SCANWORX" OCR engine (the "XEROX" wrapper).

In general, the basic sequence of operations in an OCR recognition operation can be summarized as follows: (1) an image in a specified image format is provided to the OCR engine; (2) a list of regions or zones corresponding to regions on the image to be recognized are presented to the engine (zones are rectangular regions within the image defined by the upper-left and lower-right corners); (3) configuration commands are given to the engine to control the recognition process; (4) the character recognition process takes place; and (5) the OCR results are returned from the engine and formatted appropriately for output.

The wrapper is started by the OCR system 104 when the OCR system controller 112 receives a request for service via one of the OCR system API commands shown in FIG. 2, from a client, e.g., scanning workstation 107, facsimile 110 etc. During the OCR system operation, the XEROX wrapper receives a set of commands from the controller 112. Some of the commands from the controller are mapped one-to-one onto calls in the "SCANWORX" API, and the remainder are used to set configuration parameters for the recognition process by the "XEROX" engine or to control post-processing of the OCR results. The table depicted in FIGS. 5A–5B lists the general flow of processing in the "XEROX" wrapper. The OCR system API commands drive the recognition process, that is, the wrapper responds to commands sent by the controller. The OCR system API commands are performed roughly in the order in which they are shown in FIGS. 5A and 5B.

The several streams of text and attributes from the various individual OCR devices $104_1$–$104_N$ are sent to a synchronization unit 40 (FIG. 4) which carries out the process of synchronizing individual text streams. The text streams can get out of synchronization due to insertion and deletion errors occurring in the various OCR devices $104_1$–$104_N$. In addition, OCR devices $104_1$–$104_N$ may make more complex errors, such as dropping whole words and whole lines. Some OCR devices also introduce synchronization problems where they indicate (for example, through use of a tilde) that one or more characters may be missing at a given point but do not indicate how many characters are missing.

To compensate for the above problems, synchronization unit 40 is provided to align the output character positions from the various OCR devices $104_1$–$104_N$. The synchronization, may be accomplished, for example, in a software routine which takes the individual text streams that contain all of these different problems and synchronizes them so that they can be voted upon by voting unit 50. A specific embodiment is found in the microfiche appendix. The underlying principles of the operation of the synchronization unit 40 are described below in connection with a specific example.

Synchronization of the outputs of multiple commercial OCR systems requires the system to take into account common problems associated with the use of multiple OCR systems. OCR devices make errors that can change the number of characters in a given region of text. For example, a small letter m may be misrecognized as two letters, an r followed by an n. Another problem encountered in synchronization arises when recognition confidence is sufficiently low. In this case most OCR devices will output a special character (often a tilde). This indicates that an arbitrary number of characters were not recognized at that location. OCR devices may drop characters, words, and even whole lines. In many such cases, they fail to indicate that any characters have been dropped from their output stream making it extremely difficult to line up (or synchronize) the various character streams.

There are known algorithms that can be used to match up multiple strings of text. Perhaps the best-known method is the Wagner-Fisher algorithm described in Wagner et al., "The String-to-String Correction Problem," Journal of the Association for Computing Machinery, Vol. 21, No. 1, January 1974, pp. 168–173, incorporated herein by reference. The Wagner-Fisher algorithm calculates an edit distance metric that provides a measure of how closely two lines match up by considering the number and relative weight of editing steps which would need to be carried out to change the lines to an identical match. By themselves, such algorithms do not fully compensate for the kinds of errors noted above. Thus, a further object of the OCR system of the instant invention is to improve synchronization from multiple OCR devices so as to increase the overall performance of the system. Such improvement is obtained using character position information provided by the various individual OCR devices.

In addition to indicating character identity and recognition confidence, many commercial OCR devices can produce information on character position. Systems providing the most detailed information output x and y position coordinates for every character on a page. More commonly, the x and y coordinates of the upper left and lower right pixels of a word, the word bounding box, are indicated. According to the instant invention, positional data is used in aligning the outputs from multiple OCR devices. The instant invention uses a combination of positional data with the string matching algorithms to produce an optimum alignment of multiple OCR devices.

The x and y position data can be used as a primary source of information to synchronize the lines output by the individual OCR devices when the information is provided by most or all of the individual OCR devices. The data can also be used as a key means of establishing synchronization of characters within a line. In this case, local fine-tuning of the synchronization can then be achieved using the Wagner-Fisher algorithm. Alternatively, when less position data is available, the Wagner-Fisher algorithm can be used to calculate the positional relationship having the optimum edit metric and the positional data where available can be used to discard erroneous matches and to alleviate many of the problems associated with the Wagner-Fisher algorithm alone. The above principles are illustrated by the following example.

Figure 6B-1:
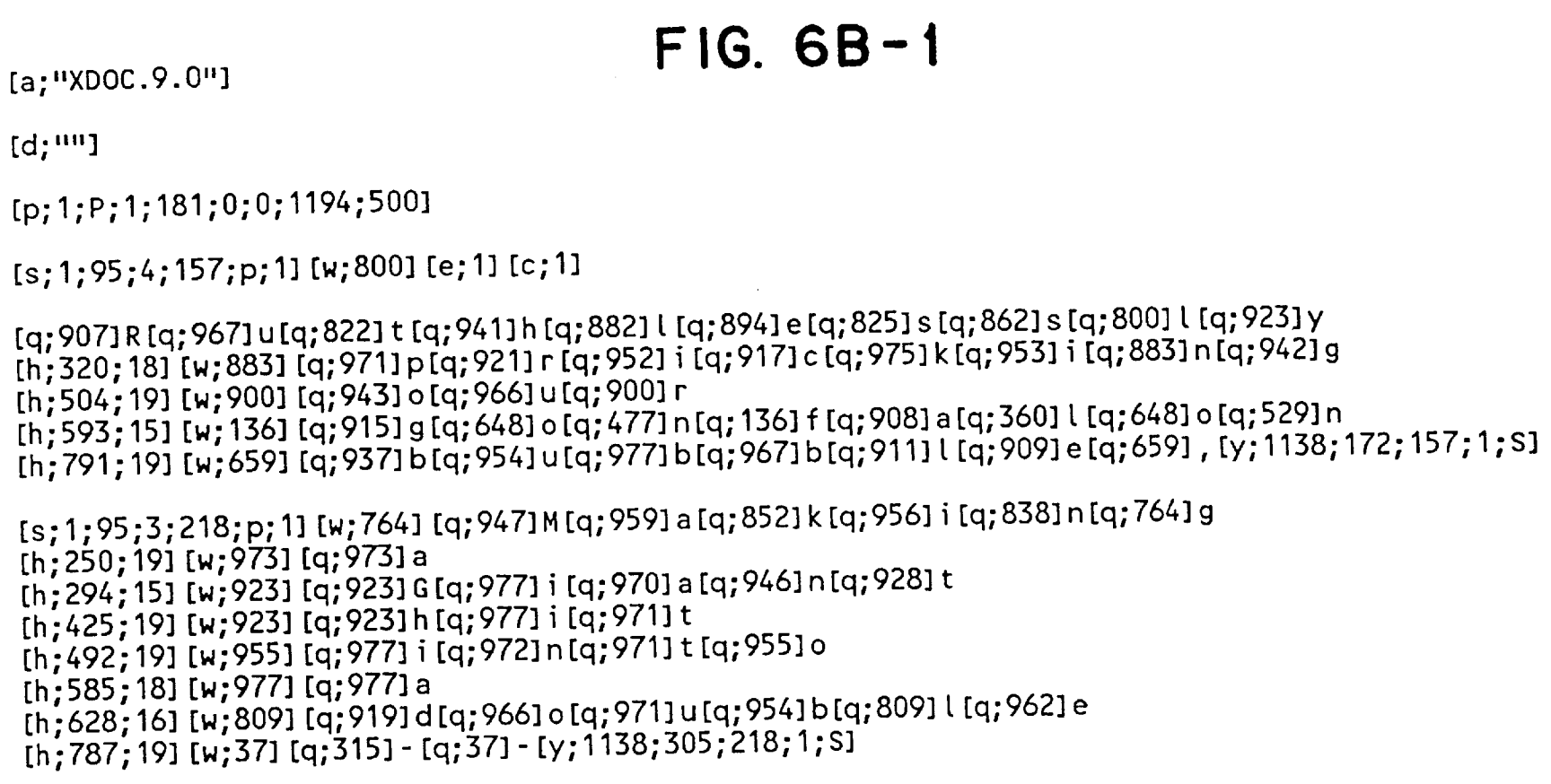
Figure 6B-2:
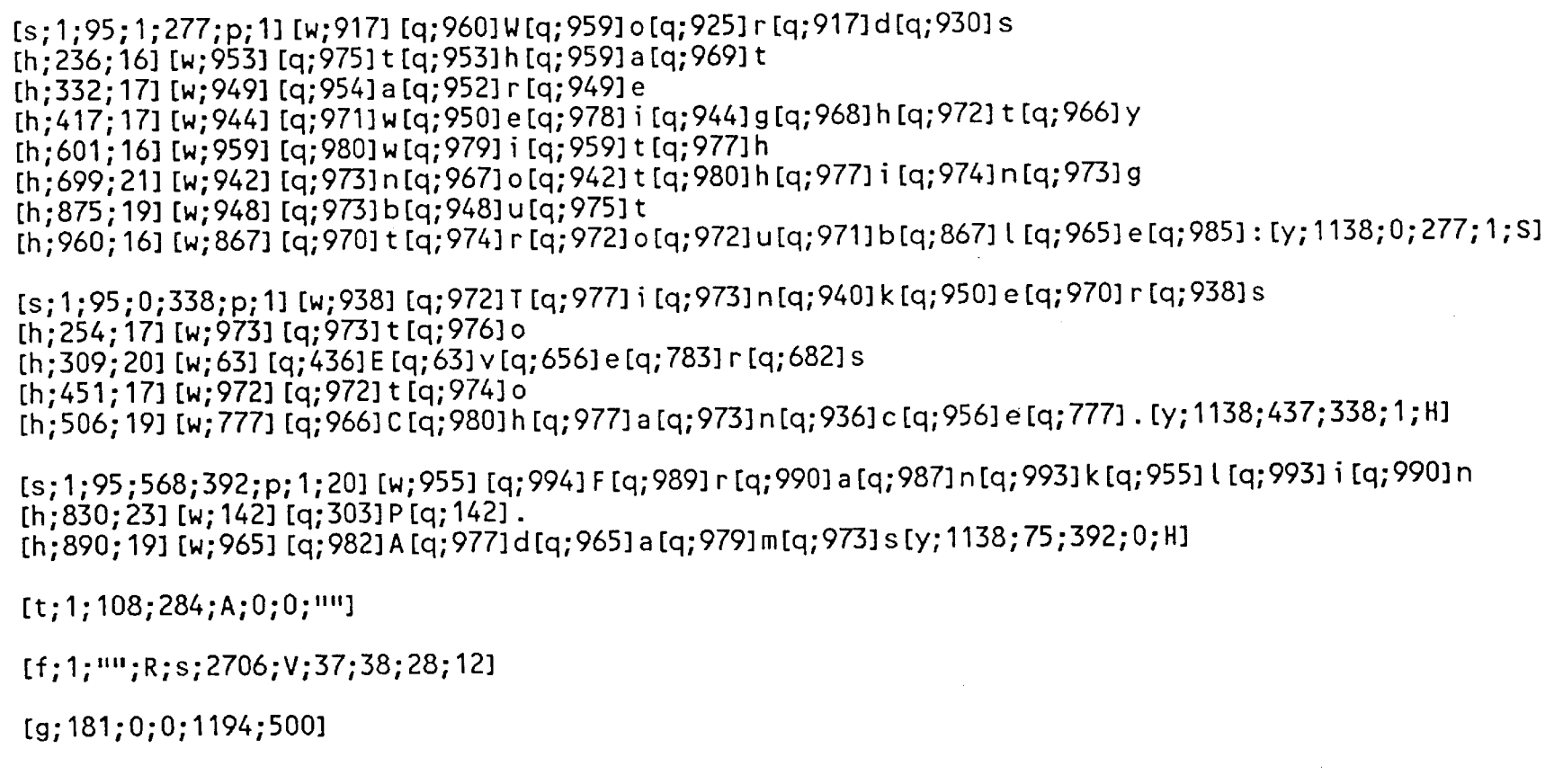

In the following example, the output from three OCRs is used to demonstrate the principal of line synchronization. FIG. 6A illustrates the image used in this example. The "XEROX's SCANWORX" API, as described above, generates its output in an internal format known as XDOC. The output from the "XEROX's SCANWORX" API is depicted in FIG. 6B. In FIG. 6B blank lines have been inserted for ease of readability. XDOC is an XIS proprietary format for eventual conversion to other formats. The output and operation of the "SCANWORX" system are described in "SCANWORX" API Programmer's Guide, Version 2.0, (Jan. 4, 1993), the contents of which are incorporated herein by reference.

The XDOC output is then converted by its wrapper into a common format, in this instance Processed Document Architecture (PDA). PDA is a proprietary format promulgated by Calera Recognition Systems Inc., and widely used as a format for intermediate results in OCR systems. In this example, we employ a modified PDA, with confidence values in the range from 1 to 999 (a confidence value of 1000 implies that the particular OCR device does not provide confidence indications). This converted text is reproduced in FIG. 6C. The PDA escapes are depicted as $ (again, blank lines have been inserted for readability, each such single blank line actually being preceded by a space).

Once the outputs from the OCR devices have been collected in a common format (e.g., PDA), they are then analyzed for line synchronization prior to voting.

Figure 6C:
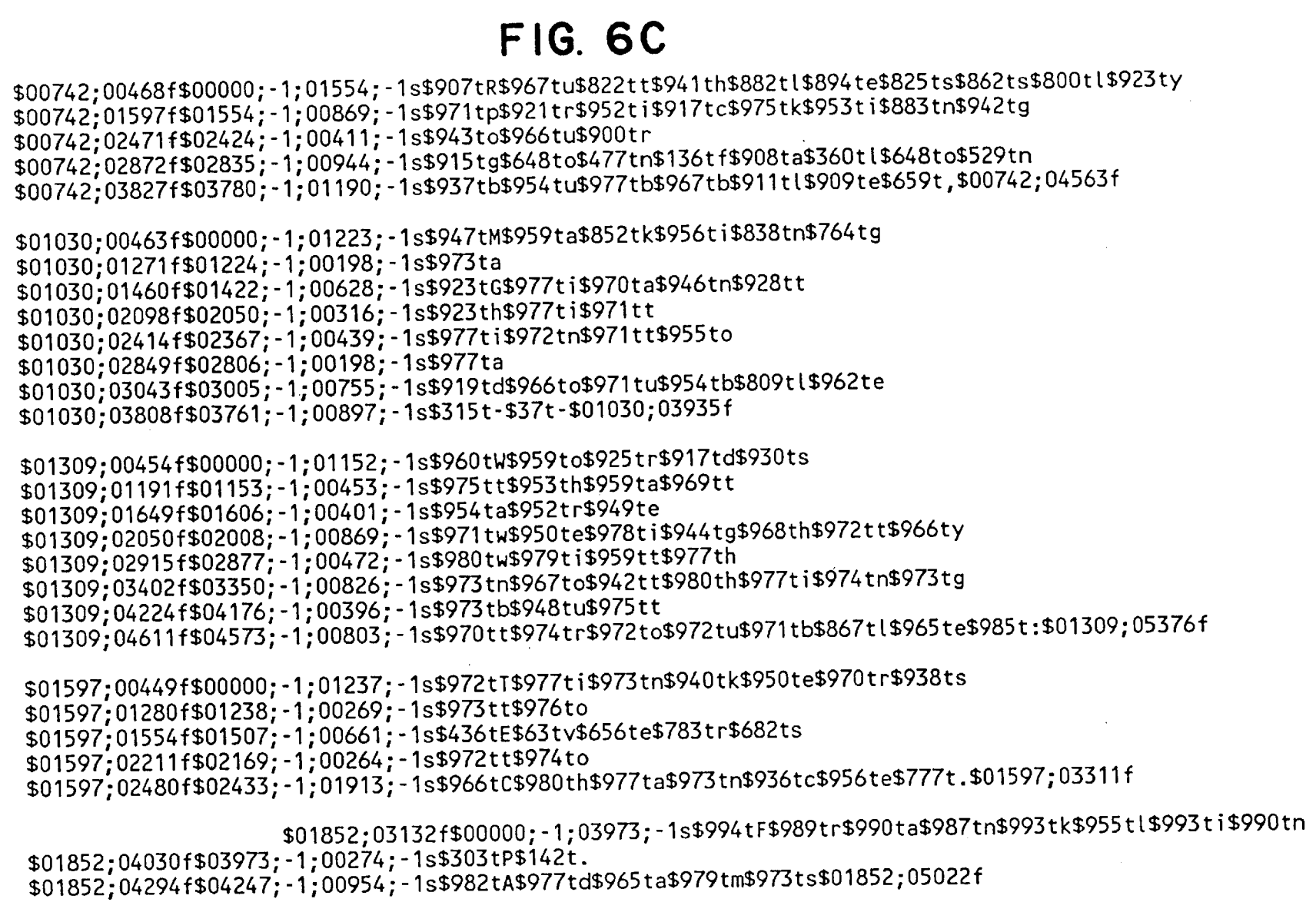
Figure 6D-1:
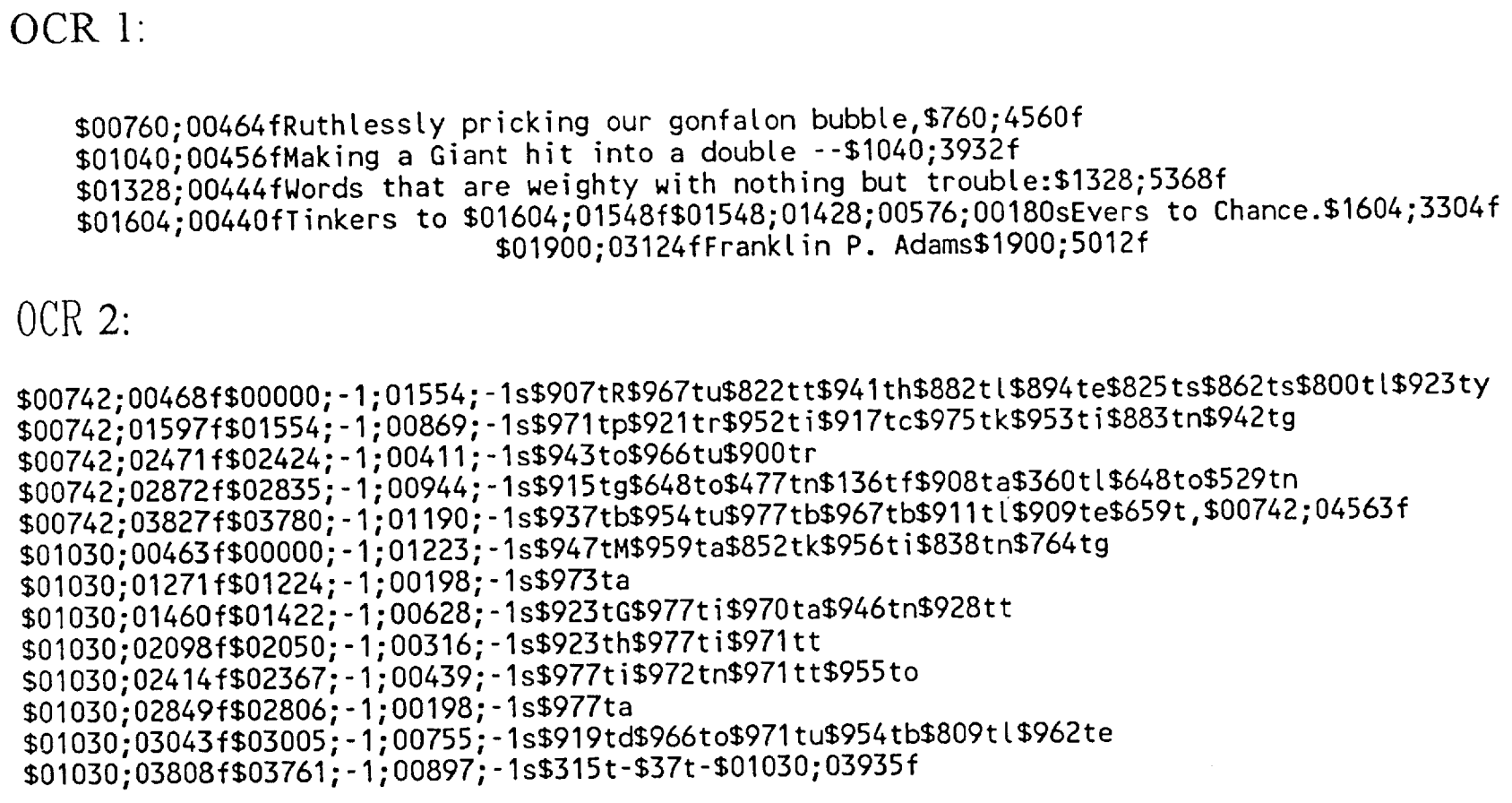
Figure 6D-2:
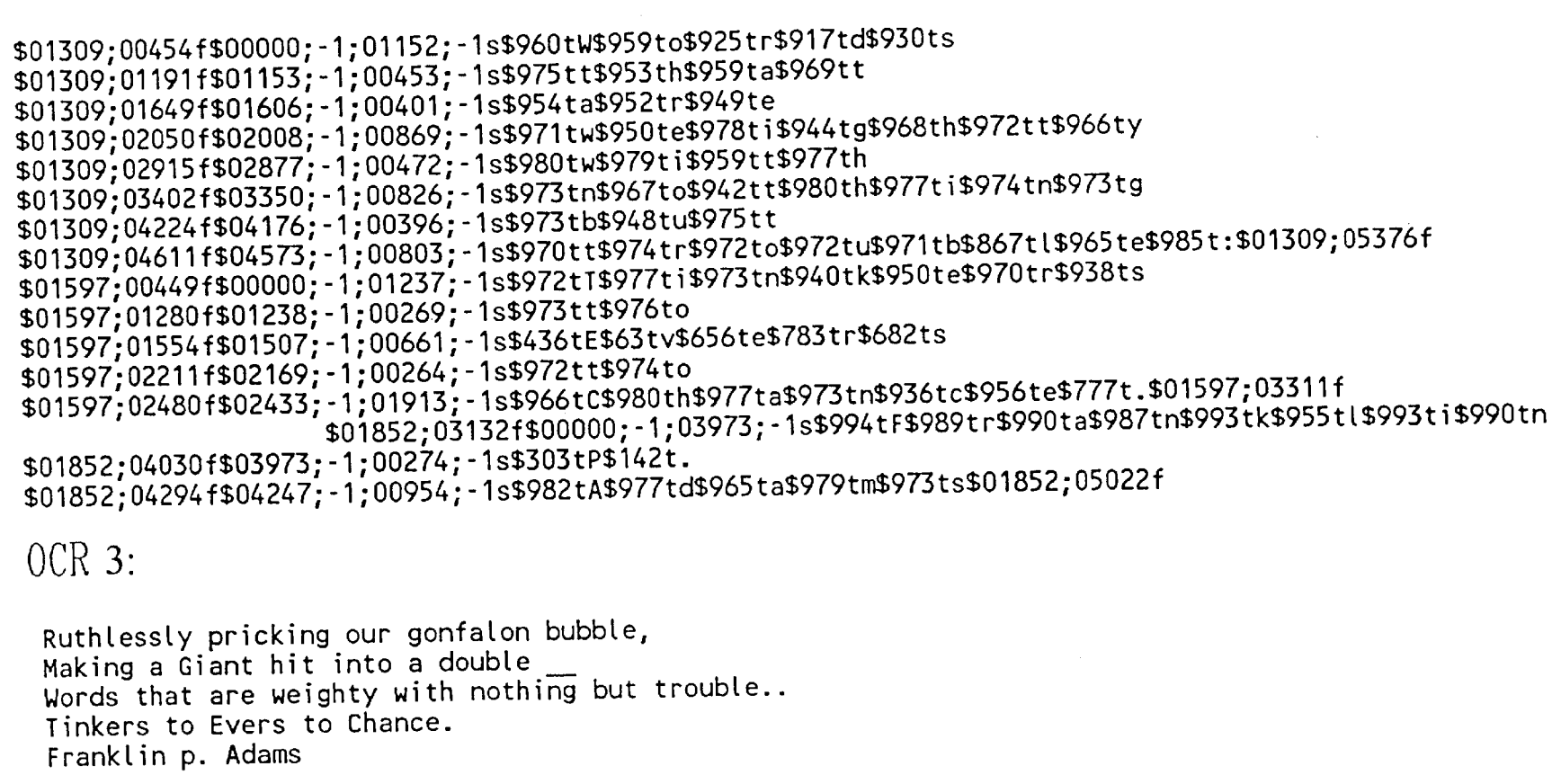

The synchronization begins with the outputs from three OCR devices, OCR 1, OCR 2, and OCR 3, depicted in FIG. 6D. Each of the outputs depicted in FIG. 6D represent an output from a different OCR device in the common PDA format. For example, the "SCANWORX" output of FIG. 6C is OCR 2 in FIG. 6D. In the illustration, the output from OCR 3 provides no additional useful information beyond the character indication. OCR 2 provides the most additional information, providing additional information for each character. The output for OCR 1 provides additional information for each line only. A more human-readable description of these results is shown in FIGS. 7A–7B, 8A–8B and 9A–9B, for OCRs 1–3 respectively. In these figures, the characters <x> indicate the number of lines before the character; those with ! x! indicate the number of spaces before the character. Other characters indicate an index of the non-blank/non-linefeed characters, positional information for the character, the actual character, the confidence level and bounding boxes for the character and for the word translated from the PDA format.

Once all the input has been parsed into lines, metrics for closeness of the lines for synchronization are calculated. The calculation results are shown in FIG. 10. Using dynamic programming techniques, pairwise calculations of the Wagner-Fisher edit distance metric are performed and when these metrics indicate a significant level of equivalence (e.g., 80 or better), synchronization is assumed. The additional information in the x/y position data at the start of the line is then used to check if the lines occur at the same location, even though the edit distance metric diverges because of differences in the OCR outputs.

Data line O for the three OCRs (renumbered 0, 1, and 2) is shown below.

```
0 === 0 0 Ruthlessly pricking our gonfalon bubble,
0 === 1 0 Ruthlessly pricking our gonfalon bubble,
0 === 2 0 Ruthlessly pricking our gonfalon bubble,
```

The table below illustrates the values of the metric and the x/y position data for line O.

| ocr:line | ocr:line | W-F metric | x/y Position |
|---|---|---|---|
| 0:0 | 1:0 | 100 | 20 |
| 0:0 | 2:0 | 100 | |
| 1:0 | 0:0 | 100 | 20 |
| 1:0 | 2:0 | 100 | |
| 2:0 | 0:0 | 100 | |
| 2:0 | 1:0 | 100 | |

In this case the W-F metric is 100 throughout since the data lines are identically recognized. The values associated with given line match-ups are totaled and the lines are chosen for the voting process described more fully below. The process then continues with the next line (i.e., line 1).

```
1 === 0 1 Making a Giant hit into a double --
1 === 1 1 Making a Giant hit into a double --
1 === 2 1 Making a Giant hit into a double _
```

The W-F metric for the second line is as follows.

| ocr:line | ocr:line | W-F metric | x/y Position |
|----------|----------|------------|--------------|
| 0:1 | 1:1 | 100 | 20 |
| 0:1 | 2:1 | 94 | |
| 1:1 | 0:1 | 100 | 20 |
| 1:1 | 2:1 | 94 | |
| 2:1 | 0:1 | 94 | |
| 2:1 | 1:1 | 94 | | and so forth, through each line. Note in the second line, OCR 2 (the third OCR) differs in the last two characters from that of OCR 0 and 1.

In an instance where the third OCR device fails to output the second line, the tables and totals would be different. The first line (line 0) would remain the same, the second line (line 1) would be:

| ocr:line | ocr:line | W-F metric | x/y Position |
|----------|----------|------------|--------------|
| 0:1 | 1:1 | 100 | 20 |
| 0:1 | 2:1 | 45 | |
| 0:1 | 2:2 | 35 | −14 |
| 0:1 | 2:3 | 26 | −28 |
| 1:1 | 0:1 | 100 | 20 |
| 1:1 | 2:1 | 45 | |
| 1:1 | 2:2 | 35 | −14 |
| 1:1 | 2:3 | 26 | −28 |
| 2:1 | 0:1 | 45 | |
| 2:1 | 0:2 | 96 | −14 |
| 2:1 | 1:1 | 45 | |
| 2:1 | 1:2 | 96 | −14 |

In the above example where a line is dropped, the position data value is negative where the system attempts to synchronize the correct lines with lines further along in the input streams. This position data value can be calculated as a function of actual x/y position data or as a percentage of the OCR input that would be effectively skipped if this matching were selected.

A further refinement of the x/y position value is computed when the totals of the best OCRs are used. Assume, for example, that the best OCRs are known to be the first and second OCRs (OCRs 0 and 1):

```
1 === 0 1 Making a Giant hit into a double --
1 === 1 1 Making a Giant hit into a double --
```

Following the selection of lines 0:1 and 1:1, determination of the next line continues as before:

| ocr:line | ocr:line | W-F metric | x/y Bonus |
|----------|----------|------------|-----------|
| 0:2 | 1:2 | 100 | 20 |
| 0:2 | 2:1 | 96 | |
| 1:2 | 0:2 | 100 | 20 |
| 1:2 | 2:1 | 96 | |
| 2:1 | 0:2 | 96 | |
| 2:1 | 1:2 | 96 | |
| 2 === 0 2 | | Words that are weighty with nothing but trouble: | |
| 2 === 1 2 | | Words that are weighty with nothing but trouble: | |
| 2 === 2 1 | | Words that are weighty with nothing but trouble.. | |

The computation of lines 3 and 4 continues as in the above example.

Once the output text with associated attributes from the various OCR devices $104_1$–$104_N$ have been synchronized, the synchronized text and attributes streams are provided to voting unit 50. The voting unit 50 analyzes the results from the various OCR devices $104_1$–$104_N$ to provide a single text stream which represents the OCR system's best estimate of the original characters on the original page or zoned images. In addition, each character in the output character stream has certain attributes associated with it. This attribute, which is provided as an output of the voting unit 50, is a composite or combination attribute since it owes its origin to the attributes of the individual OCR devices. For example, a value indicating the confidence in the recognition of each character is incorporated into the output character stream.

Additional functions may also be carried out in differential processing systems. Those functions involve monitoring for errors in the individual OCR devices and correcting for those errors. This can include re-initializing the software on the individual circuit boards for OCR devices implemented by software or restarting the hardware devices, as the case may be.

Theoretically, the number of OCR devices $104_1$–$104_N$ required to achieve a vote according to the instant invention is 2. As will be more fully described below, even with only two OCR devices giving different indications, a different combined confidence value for each indication will most likely be obtained, and the character having the highest combined confidence value could be selected. In general, however, tests have indicated that, typically, at least five different OCR devices are necessary to achieve the reliability required for most OCR applications.

Since the individual OCR devices $104_1$–$104_N$ operate at different speeds, it is also necessary to take into account this speed in managing the distribution of images. The individual OCR devices $104_1$–$104_N$ can be operated in either synchronous or asynchronous mode. In a synchronous mode, a single image is provided to the set of OCR devices $104_1$–$104_N$ and then queuing software is used to wait until each OCR device has processed a given image and output its results prior to sending out a new image. The OCR devices $104_1$–$104_N$ could also be used in the asynchronous mode. In this mode, if there is one device significantly slower than the others, one could, for example, use a plural number of the same, slow, OCR device and alternate the input pages to achieve a better balance in the overall processing of images through the system.

The flow chart depicted in FIG. 11 illustrates an operation of the voting unit 50 (FIG. 4) and the Editor 105 (FIG. 1) in an OCR system according to the instant invention. At step S101, synchronized character data including attributes are received into the voting unit 50. For each character data or position corresponding to where a character should lie, there will be one or more different character indications. In other words, each of the OCR devices will output its indication (or recognition) of the character data for that position to the voting unit 50. The number of different character indications will depend upon how many of the OCR devices agree. In the example where three OCR devices are used, from one to three different character indications will be considered. If only two OCR devices agree, for example, there will be two different character indications (i.e., one character indicated by both of the two OCR devices which agree and a second character indicated by the other OCR device). It is noted that at times, individual OCR devices may fail to produce an output for a line, a zone of text within a page, or even a whole page. Thus, the indication by a device may include an indication of no character.

At step S102 a combined confidence value is assigned to each of the indicated characters for each character location.

Alternatively, such an operation could be carried out on a word by word basis in a similar fashion. The characters and their associated combined confidence values could be stored, for example in a table. The generation of the combined confidence values assigned to the various indicated characters is more fully described in connection with FIG. 12. In general, the combined confidence value represents a combination or composite confidence since it is derived on the basis of output from each OCR device. At step S103 the indicated character having the highest combined confidence value is selected to be output from the OCR system 104.

By way of example, if each of the different indicated characters and their assigned combined confidence value are stored in a table, the character having the highest associated combined confidence value can be selected from the table. Alternatively, a register could be used to hold the current character indication and its combined confidence value until another indicated character is indicated as having a higher confidence value for that particular character location. Such an implementation will be more fully understood from the description of the voting unit 50 set forth below. Various other software and/or hardware implementations will be apparent to one of ordinary skill in the art.

At step S104, the selected character and its combined confidence value is output as a recognized character from the OCR system 104. At step S105, a desired threshold combined confidence value is selected which corresponds to a minimum desired accuracy. At decision block S106, it is determined whether the output combined confidence value is less than the threshold combined confidence value selected in step S105. If the output combined confidence value is greater than or equal to the threshold combined confidence value, the accuracy of the indicated (i.e., selected) character is determined to be satisfactory and the selected character for that particular character position is output as an accurate character at step S107. If on the other hand, the output combined confidence value is less than the threshold combined confidence value, then at step S108 the character associated with that combined confidence value can be displayed on display 120 (FIG. 1) for manual checking in the editor 115 (FIG. 1) or can be stored in computer memory 106 with a flag condition for later display and manual correction or other appropriate processing.

At step S109, the character is updated (corrected) in accordance with the manual check if appropriate. Upon completion of the manual check, and update if required, the character is then considered to be an accurate character and is output as in step S107.

It is noted that step S105 may be done initially as an input set-up parameter and is typically not selected each time for each character. The initially selected threshold confidence value is used each time in step S106.

FIG. 12 represents a more detailed description of how the combined confidence value is determined and assigned to the different individual characters indicated by the OCR devices. The flow chart of FIG. 12 depicts an operation carried out generally in voting unit 50 (FIG. 4) for each single location or character position in the text stream representing the digital page image. The voting unit 50 receives the information for a particular single location or character position at step S1. At this point the system begins its operation of assigning a combined confidence value to each of the characters indicated by one or more of the OCR devices. The process of determining and assigning combined confidence values may be understood by the operation carried out in steps S2–S12.

At step S2, the system selects a character (t) from an alphabet T (i.e., a set of characters). Alphabet T may include, for example, only the characters which are indicated by at least one of the individual OCR devices. This would be preferable where the number of OCR devices used is relatively small. However, if the number of different OCR devices used is increased to a relatively large number, alphabet T may be a generic alphabet of all or most of the possible characters which are contained in the digital page image. Also, alphabet T may be limited to a list of specific characters to which it is known that the page image should correspond. For example, if it is known that the output should only be numbers (i.e., 0–9), the Alphabet T could contain the numbers 0–9, and as will be understood, only indications which could be correct will be checked and no value would be assigned to non-numeric indicated characters.

At step S3, a value Total (t) associated with the selected character (t) is set to zero. The value of Total (t) is used to build the combined confidence value to be assigned to each character (t). At step S4, an OCR device (n) from OCR devices 1–N is selected. At decision block S5, it is determined whether the character indicated by the OCR device (n) is equal to the selected character (t). If the character selected corresponds to the results from the OCR device (n), then the system proceeds to step S6. Otherwise, the system proceeds to step S9 and contribution to the final value of Total (t) for the character (t) will be made by the voting unit 50.

At step S6, it is determined whether a confidence flag is set by the particular OCR device (n). If a confidence flag, Flag (n) is set, this indicates that the OCR device (n) has some uncertainty as to the confidence in its resultant character. The confidence flag may be an on/off indication or may represent a value indicating the degree of confidence. If no confidence flag or value is set, then the total value associated with the character Total (t) is set to the current value of Total (t) plus a value which is derived as a function depending upon both (n) and/or (t) represented by F(n,t). The use of the term "function" denotes a function in its broadest sense. For example, the functions may be discontinuous having a different relationship for each parameter (n) or (t). As described above, the accuracy with respect to a particular OCR device may vary depending upon the character which is being used. Thus, the particular character (t) which is being considered as well as which of the OCR devices (n) which indicates the character (t) may be used to generate the value associated with that character indication. Further, as described above, each of the various OCR devices have their own degree of accuracy. Thus, a particularly accurate OCR device may be given more weight according to the function F(n,t) than a different OCR device which is known to be less accurate. The functions F(n,t) may be stored as a look-up table in computer memory 114.

If at step S6 it is determined that a flag is set, the system proceeds to step S7. Step S7 is similar to step S8 but includes the addition of a probability weighting factor which is multiplied by the function F(n,t). The weighting factor in its simplest sense could represent a constant, for example, ½, which diminishes the value Total (t) associated with a particular indication when the confidence flag is set by the OCR device (n). In a manner similar to the function F(n,t) the weighting factor could be accomplished in a probability function P(n,t) which takes into account both the particular OCR device (n) which sets a confidence flag as well as the particular character for which the confidence flag is set. Further, in the case where the confidence flag has multiple values rather than only an on/off state, the particular value of the confidence flag could also be used to weight the OCR device's contribution to the value Total (t) assigned to a particular character. This could be represented by a probability function P(n,t,v) where v represents the value of the confidence indication supplied by the particular OCR device for the recognized character t.

From step S7 and step S8 the system proceeds to step S9. At step S9, the device asks whether there are any OCR devices (n) which have not yet been considered by the system for that character (t). If there remain OCR devices, then the system proceeds to step S4 which selects a new OCR device from N. Thus, the loop represented by steps S4 through S9 determines the combined confidence value for each individual character (t) taking into consideration the contribution, if any, from each OCR device. As the system proceeds through the loop represented by steps S4–S9, the value Total (t) is increased according to the number of OCR devices indicating character (t).

At the conclusion of step S9, when it is determined that the outputs from all of the OCR devices have been checked to see if the particular character (t) was indicated by the OCR devices and to provide their contribution to the Total (t) for that character, the system proceeds to step S10. At this time, the system determines whether it has checked all of the characters (t) in the Alphabet T. If there remain characters (t) in the Alphabet T which have not yet been checked, the system returns to step S2. At step S2, a new character (t) would be chosen from the alphabet T and the system will proceed for that character.

If at step S9 it is determined that there are no remaining OCR devices (n) which have not been checked for the particular character (t) then the value Total (t) represents the total value for all of the OCR devices which indicate the particular selected character (t) from the alphabet T as the indicated character. It is further understood that the value Total (t) will indicate a confidence of the accuracy of the indications since in the simple case the more OCR devices which indicate (t) and are confident of the indication, the greater the value Total (t) will be. The value associated with Total (t) of that character is assigned to that character (t) as its combined confidence value at step S12. For example, character (t) and the value Total (t) could be entered into a table or a holding register.

As described above, the values Total (t) represent a value associated with a character (t) dependent upon the number of devices choosing that value, the confidence within each device of that choice, and the relative reliability of the devices making that choice and confidence indication with respect to other OCR devices. Thus, this value represents a combined attribute (confidence) value. In general, each letter from the alphabet T which is indicated by any one or more of the OCR devices will have an associated combined confidence value represented in the final value Total (t) assigned at step S12. From characters (t), each having an associated combined confidence value, the character having the highest combined confidence value is selected (step S103; FIG. 11). This is because the particular character having the highest confidence value is the most likely correct character. Thus, the operation of the voting unit 50 according to the flow chart of FIG. 12, acts as a sophisticated voting scheme which takes into account the number of OCR devices indicating a character, the accuracy of any OCR devices indicating the character and the confidence with which the OCR devices indicate the character.

It is further evident from the above description, that the actual value associated with that character also provides an indication of how confident the overall system is in a combined manner that the character (t) selected is accurate.

Thus, the system is able to easily and efficiently output from all of the inputs from synchronization unit 40 (FIG. 4) a single text stream including a combined confidence value which indicates the likelihood that a character is correct. In this manner, an accuracy of well over 99% of the characters may be obtained by checking those values which are less than the optimal combined confidence value which would result if all of the OCR devices selected the same character and none of the OCR devices set a flag at steps S5 and S6, respectively.

A simple illustration of the voting process using the results synchronized in the above example is as follows. First regions of disagreement are determined for a single line. From the simple example, the most interesting case is that of the signature line 4:

```
4 === 0 4 Franklin P. Adams
4 === 1 4 Franklin P. Adams
4 === 2 4 Franklin p. Adams
```

For this region of disagreement (in this case the two 'P' and the one 'p'), simple majority voting and confidence would indicate a character 'P' with a ⅔ confidence (667 out of 1000). Utilizing the individual OCR reports of confidence would generate a confidence value of 434=((1000+303)/3000) for 'P' (and a confidence value of 333 for 'p'). With statistical measures of the character accuracies of the individual OCRs, this confidence value can be further refined. For example, if the accuracies of the underlying OCRs on the characters reported are: 95%, 90% and 90%, the numbers would be 408=[(0.95*1000)+(0.90*303)] for 'P' and 273 for 'p'. Thus, using the additional character attribute information output by the individual OCR devices the accuracy with which the letter 'P' is indicated is significantly improved.

The instant invention is not limited to the indication of a single character for each character location. The system could be designed to output two characters having the highest combined confidence value. The editor could then provide the operator with the next most likely indication during a manual check of the created text. For example, suppose the system had read the word "the." If some foreign marks appeared in the original image near the bottom of the "h" the system may indicate (or recognize) a "b" as its highest confidence character with a combined confidence value of 640 (out of 1000) and the character "h" with a confidence value of 460. The computer program stored in memory 114 would easily be programmed to output the highest combined character "b" and present a window or split screen (as is commonly done in spell-checking programs) showing the second highest combined character "h". The operator could then easily recognize that "h" is the correct value.

The instant invention has been described above with reference to specific embodiments. It is recognized that various modifications will be recognized by those having skill in this art which fall within the scope of the invention. Thus, the instant invention is only limited by the appended claims.

What is claimed is:

1. A character recognition (CR) system for recognizing characters within a digital page image, comprising:

an input interface connected to receive said digital page image;

a plurality of CR devices, each connected to receive said digital page image from said input interface, each of said CR devices converting a portion of said digital page image into output data signals indicating a character at said portion wherein the characters indicated in said output data signals constitute one or more candidate characters for said portion; and a voting unit coupled to receive said output data signals from each of said plurality of CR devices, said voting unit assigning an attribute for each indicated character as a function of the indicated character and the CR device indicating said indicated character, wherein, for each candidate character, said voting unit keeps a running tally of attributes for those of said plurality of CR devices which indicate said candidate character to arrive at a final tally, representing a composite attribute for said candidate character, when attributes for all of said plurality of CR devices which indicate said candidate character are accounted for in said running tally, and wherein said voting unit selects a recognized character from one of the candidate characters based on the composite attributes of the candidate characters and produces a combined data signal representing said recognized character.

2. A system as recited in claim 1, wherein said CR attributes include a CR confidence indication as a CR confidence value which represents a level of confidence that a character identified by a corresponding CR is accurate.

3. A system as recited in claim 2, wherein, for each candidate character, said composite attributes include a combined confidence indication which is a final tally of a running tally of CR confidence indications for those of said plurality of CR devices which indicate said candidate character and said combined confidence indication represents a level of overall confidence that said candidate character is accurate.

4. A system as recited in claim 3, further comprising:
    a text editor connected to receive said combined data signal; and
    a check indicator, said check indicator receiving said recognized character and said combined confidence indication corresponding to said recognized character and setting a flag if a value of said combined confidence indication is below a threshold value, in which case said recognized character is to be manually checked by an operator.

5. A CR system as recited in claim 1, wherein said combined signal further represents the composite attribute corresponding to said recognized character.

6. A method for recognizing characters contained in a digital page image, said method comprising the steps of:
    providing said digital page image to a plurality of character recognition (CR) devices;
    indicating in each of said CR devices an indicated character and generating an attribute associated with said indicated character for a particular character location in said digital page image;
    for each distinct indicated character, generating a running tally of attributes for those of said plurality of CR devices which indicate said distinct indicated character to arrive at a final tally, representing a composite attribute for said distinct indicated character, when attributes for all of said plurality of CR devices which indicate said distinct indicated character are accounted for in said running tally;
    selecting a selected character on a basis of said composite character attributes of said distinct indicated characters; and
    outputting said selected character as a recognized character.

7. A method as recited in claim 6, wherein said one or more attributes include a confidence indication and a CR device indication.

8. A method as recited in claim 7, wherein, for said particular character location, said selecting step includes the steps of:
    choosing a distinct indicated character having a composite character attribute of a highest value; and
    selecting said distinct indicated character chosen in said choosing step as said selected character.

9. A method as recited in claim 8, further comprising the step of:
    indicating a desired character accuracy;
    calculating an accuracy value corresponding to said desired character accuracy; and
    identifying said recognized character as a character to be manually checked if a value of said recognized character attribute is below said accuracy value.

10. A method as recited in claim 7, further comprising the step of outputting the composite character attribute corresponding to said selected character as a recognized character attribute.

11. A character recognition (CR) system for recognizing characters within a digital page image and for providing a confidence indication indicative of a degree of confidence in text recognized by said system, said system comprising:
    an input means for inputting said digital page image into said CR system;
    recognition means for receiving said digital page image and for performing, for each defined location on said digital page image, a plurality of different recognition techniques, each of said different recognition techniques indicating a recognized text and assigning an associated confidence indication to said recognized text, said recognition means outputting said recognized text and said associated confidence indication produced by each of said different recognition techniques; and
    selecting means, coupled to receive said recognized text and said associated confidence indication produced by each of said different recognition techniques from said recognition means, for selecting a combined recognized text from a plurality of distinct recognized text on a basis of a combined confidence indication of each of said distinct recognized text, wherein a combined confidence indication of a distinct recognized text represents a final tally of a running tally of confidence indications associated with said distinct recognized text; and
    output means for outputting said combined recognized text as a text recognized by said system.

12. A character recognition (CR) system for recognizing characters within a digital page image, comprising:
    a CR unit, including a plurality of CR devices receiving said digital page image and converting said digital page image into corresponding streams of character data, at least one of said streams of character data corresponding to one of said CR devices including positional information;
    a synchronization unit coupled to receive said streams of characters from said CR unit, said synchronization unit aligning character positions within said streams of data using at least said positional information and outputting synchronized streams of character data; and a voting unit coupled to receive said synchronized streams of character data for selecting an output indicated character at regions where, at a given frame of synchronization, at least two of said synchronized streams of character data indicate different recognized characters, wherein a running tally of how many CR units is associated with each different recognized character is kept and said output indicated character is selected based on a final tally of the running tally.

13. A character recognition (CR) system as recited in claim 12, wherein:

said streams of character data respectively corresponding to said CR devices include character confidence indicators for each of the characters indicated by said CR devices; and the running tallies kept by said voting unit include character confidence indicators.

14. A character recognition (CR) system for recognizing characters within a digital page image, comprising:

an input interface connected to receive said digital page image;

a plurality of CR devices, each connected to receive said digital page image from said input interface, each of said CR devices converting said digital page image into a stream of characters and CR attributes corresponding to each of said characters, each of said characters corresponding to a character position in said digital page image;

a synchronization unit coupled to receive said stream of characters from said plurality CR devices, said synchronization unit combining an output of characters of said character streams so that characters which correspond to a same character position in said digital page image are output in synchronization; and a voting unit coupled to receive said synchronized output of characters of said character streams from said synchronization unit, wherein, for each frame of synchronization, said voting unit keeps a different running tally of CR attributes for each different character in said frame and outputs a character corresponding to a final tally of a highest value.

15. A CR system as recited in claim 14, wherein said synchronization unit receives x and y position coordinates for at least two character streams from said CR devices, said x and y positions being used to determine which characters are associated with said same character position.

16. A character recognition (CR) system for recognizing characters within a digital page image, comprising:

(a) an input interface connected to receive said digital page image;

(b) N CR devices, each CR device n (where n=1, 2, ..., N) connected to receive said digital page image from said input interface, each of said N CR devices indicating a character at a portion of said digital page image; and (c) a voting unit coupled with each of said N CR devices, said voting unit assigning an attribute $F(n,t)$ for each indicated character t as a function of the CR device n and the indicated character t, wherein, for each portion of said digital image, said voting unit (1) selects a character s from an alphanumeric table, (2) initializes a running tally variable $T(s)$ associated with the selected character s, (3) selects a CR device m from among said N CR devices, (4) compares the character indicated by the selected CR device m against the selected character s and, if there is a match, increases the running tally variable $T(s)$ by an amount proportional to the attribute $F(m,s)$ associated with the character s indicated by the selected CR device m, (5) repeats steps (3) and (4) for a different CR device until all N CR devices are accounted for, (6) repeats steps (1) through (5) for a different character in the alphanumeric table until all characters in the alphanumeric table are accounted for, and (7) selects the character s having a highest running tally $T(s)$ associated therewith as a recognized character.

17. A CR system as recited in claim 16, wherein said proportional amount ranges from 0 (highest uncertainty) to 1 (highest certainty).

18. A CR system as recited in claim 17, further comprising a check indicator for determining if the running tally $T(s)$ associated with the recognized character is below a threshold value, wherein if the running tally is below the threshold value, the output character is displayed for a manual check.

* * * * *